United States Patent
Hayashi

(10) Patent No.: US 12,442,892 B2
(45) Date of Patent: Oct. 14, 2025

(54) RADAR DEVICE AND POSITION DETECTION SYSTEM

(71) Applicant: Socionext Inc., Kanagawa (JP)

(72) Inventor: Joji Hayashi, Yokohama (JP)

(73) Assignee: SOCIONEXT INC., Kanagawa (JP)

(*) Notice: Subject to any disclaimer, the term of this patent is extended or adjusted under 35 U.S.C. 154(b) by 335 days.

(21) Appl. No.: 18/295,609

(22) Filed: Apr. 4, 2023

(65) Prior Publication Data

US 2023/0236284 A1  Jul. 27, 2023

Related U.S. Application Data

(63) Continuation of application No. PCT/JP2020/039461, filed on Oct. 20, 2020.

(51) Int. Cl.
| | | |
|---|---|---|
| G01S 7/03 | (2006.01) | |
| G01S 7/35 | (2006.01) | |
| G01S 13/42 | (2006.01) | |
| G01S 13/536 | (2006.01) | |

(52) U.S. Cl.
CPC ............ G01S 7/03 (2013.01); G01S 7/352 (2013.01); G01S 13/42 (2013.01); *G01S 13/536* (2013.01)

(58) Field of Classification Search
CPC ........ G01S 7/352; G01S 13/42; G01S 13/536; G01S 13/343; G01S 13/345; G01S 13/584; G01S 3/46
See application file for complete search history.

(56) References Cited

U.S. PATENT DOCUMENTS

| | | | |
|---|---|---|---|
| 8,106,755 B1* | 1/2012 | Knox | B60R 1/23 340/439 |
| 8,390,507 B2* | 3/2013 | Wintermantel | G01S 7/0233 342/70 |
| 10,948,580 B2* | 3/2021 | Yamanouchi | G01S 13/40 |
| 2017/0168134 A1* | 6/2017 | Jenwatanavet | H04W 4/80 |

(Continued)

FOREIGN PATENT DOCUMENTS

| | | |
|---|---|---|
| JP | 2007-010615 A | 1/2007 |
| JP | 2012-098107 A | 5/2012 |

(Continued)

OTHER PUBLICATIONS

O. Pochanin et al., "Estimation of Lane Width for Object Detection Using Impulse GPR with "1Tx and 4Rx" Antenna System," 2018 17th International Conference on Ground Penetrating Radar (GPR), Rapperswil, Switzerland, 2018, pp. 1-5, doi: 10.1109/ICGPR.2018. 8441578. (Year: 2018).*

(Continued)

Primary Examiner — Bernarr E Gregory
Assistant Examiner — Yonghong Li
(74) Attorney, Agent, or Firm — Rimon P.C.

(57) ABSTRACT

A radar device includes: a first receiver antenna outputting a first reception signal; a second receiver antenna outputting a second reception signal; a third receiver antenna outputting a third reception signal; a first receiver circuit processing the first reception signal; and a second receiver circuit selecting one of the second reception signal and the third reception signal and processing the selected signal. The first receiver antenna is placed apart from the second receiver antenna in a first direction and apart from the third receiver antenna in a second direction.

8 Claims, 21 Drawing Sheets

(56) References Cited

U.S. PATENT DOCUMENTS

2019/0120925 A1\* 4/2019 Lohbihler ............... G01S 11/06
2021/0181328 A1 6/2021 Hayashi

FOREIGN PATENT DOCUMENTS

| JP | 5602275 B1 | 10/2014 |
| JP | 2014-215044 A | 11/2014 |
| JP | 2018-004513 A | 1/2018 |
| WO | 2020/049648 A1 | 3/2020 |

OTHER PUBLICATIONS

G. P. Pochanin et al., "Measurement of Coordinates for a Cylindrical Target Using Times of Flight from a 1-Transmitter and 4-Receiver UWB Antenna System," in IEEE Transactions on Geoscience and Remote Sensing, vol. 58, No. 2, pp. 1363-1372, Feb. 2020, doi: 10.1109/TGRS.2019.2946064. (Year: 2020).\*

Office Action issued in corresponding Chinese Patent Application No. 202080105877.0, dated Mar. 31, 2025, with its partial translation of the Examiner's Opinion of the Office Action from the 2nd line of p. 3 to the 3rd line of p. 14.

International Search Report (ISR) dated Dec. 28, 2020 issued in International Patent Application No. PCT/JP2020/039461, with English translation.

Written Opinion (WO) of the International Searching Authority dated Dec. 28, 2020 issued in International Patent Application No. PCT/JP2020/039461, with partial English translation.

Ismail Nasr, et al., "A Highly Integrated 60 GHz 6-Channel Transceiver With Antenna in Package for Smart Sensing and Short-Range Communications", IEEE Journal of Solid-State Circuits, vol. 51,No. 9, Sep. 2016.

\* cited by examiner

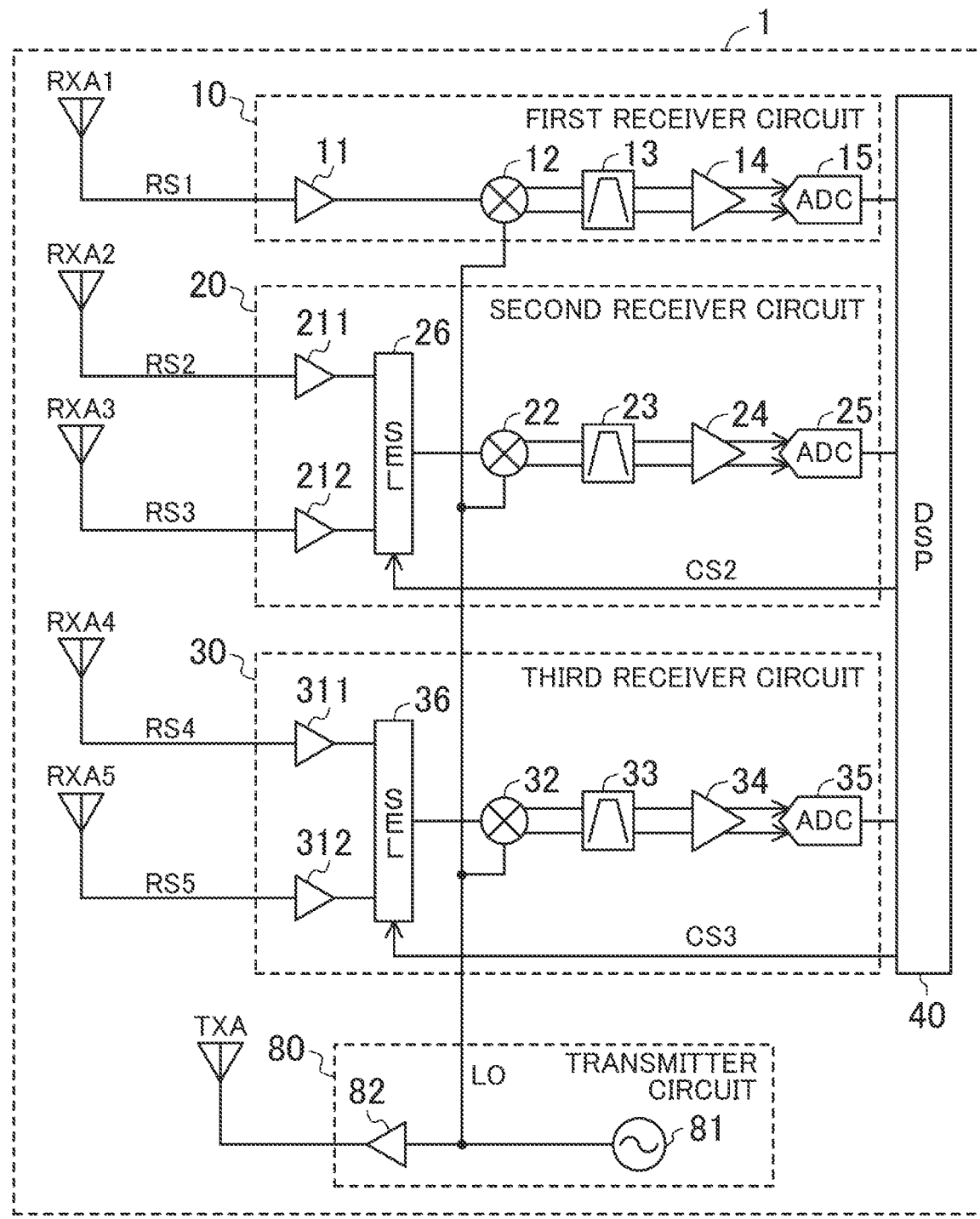

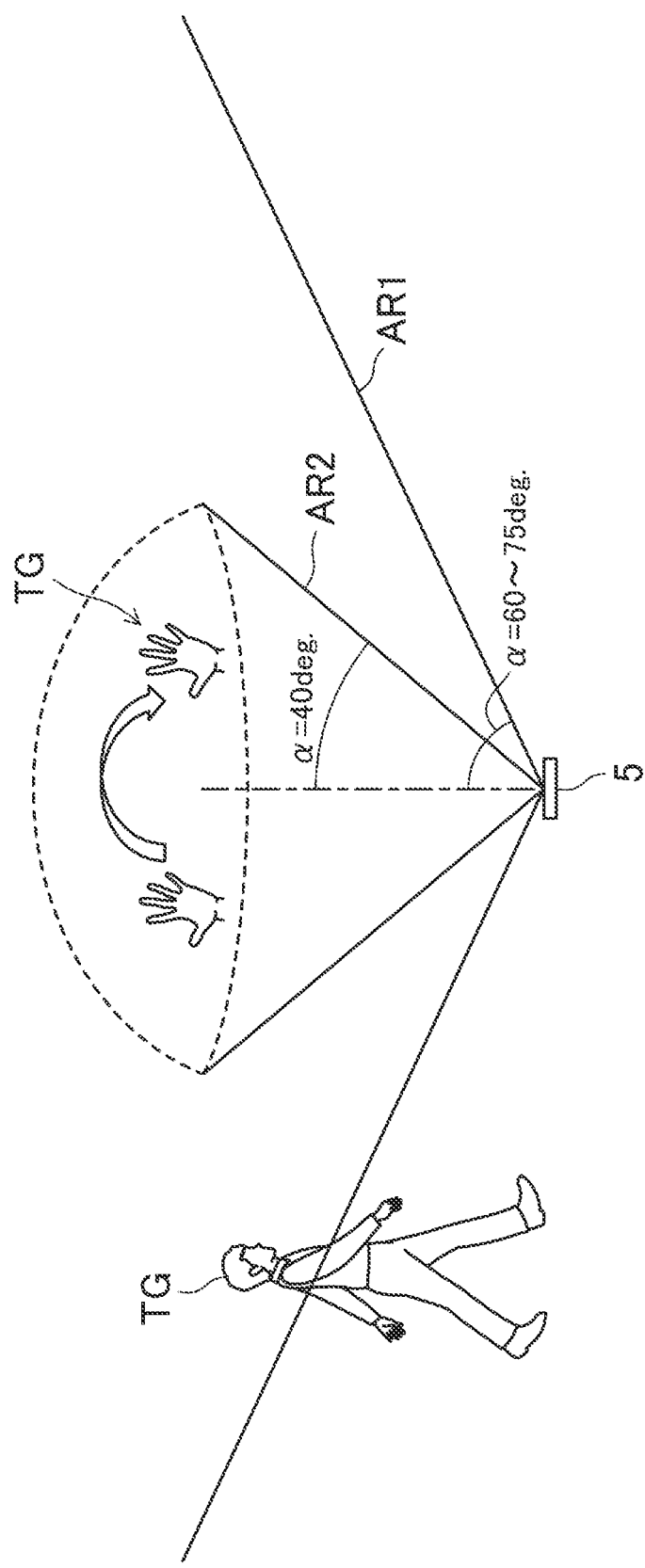

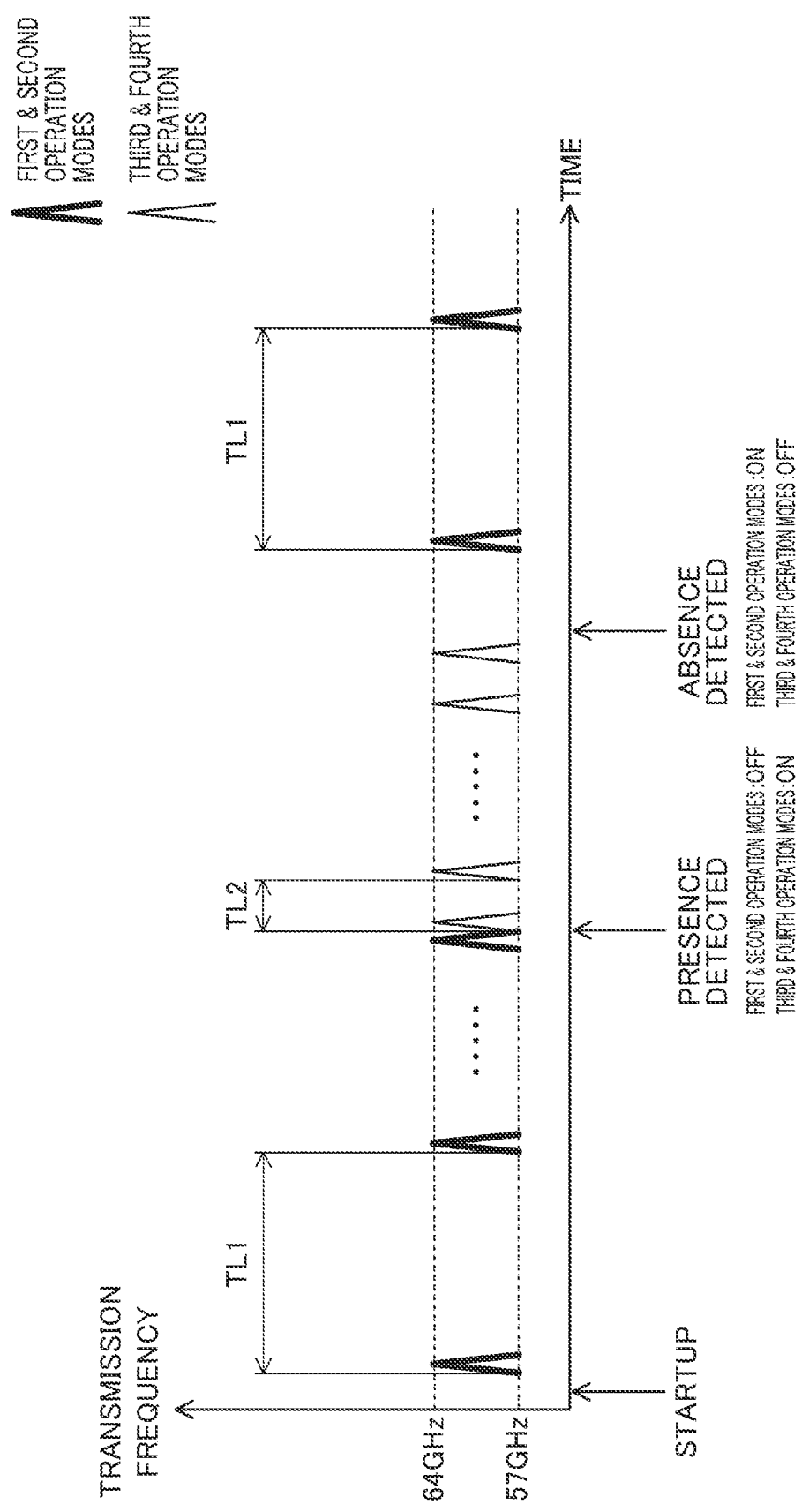

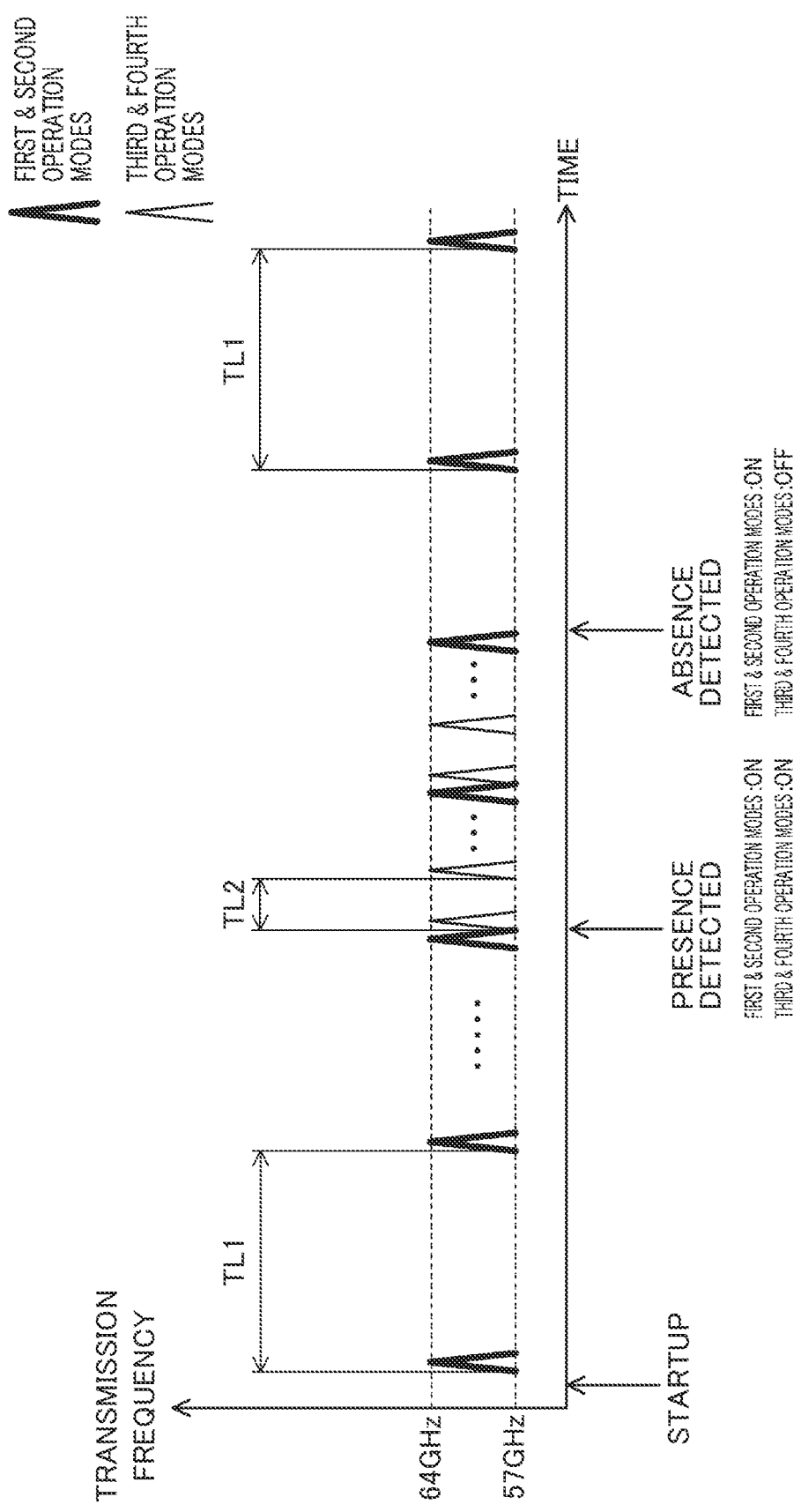

RADAR DEVICE AND POSITION DETECTION SYSTEM

CROSS-REFERENCE TO RELATED APPLICATIONS

This is a continuation of International Application No. PCT/JP2020/039461 filed on Oct. 20, 2020. The entire disclosure of this application is incorporated by reference herein.

BACKGROUND

The present disclosure relates to a radar device and a position detection system.

A radar device transmits an electric wave from a transmitter antenna and receives an electric wave reflected from an object through a receiver antenna, to detect the distance from the object and the speed of the object from the frequency and phase of the reception signal. Also, by use of a plurality of receiver antennas, not only the distance from the object, but also the direction of the object can be detected. This permits detection of three-dimensional (3D) coordinates of the object by placing antennas two-dimensionally.

For example, Ismail Nasr, et. al., "A Highly Integrated 60 GHz 6-Channel Transceiver With Antenna in Package for Smart Sensing and Short-Range Communications", IEEE JOURNAL OF SOLID-STATE CIRCUITS, VOL. 51, NO. 9, SEPTEMBER 2016 (Non-Patent Document) describes a device including a 4-channel receiver and a 2-channel transmitter to recognize the 3D coordinates of an object. Also, U.S. Pat. No. 8,390,507 (Patent Document) describes a technique in which an antenna switch and one receiver are placed downstream of four receiver antennas and signals from the receiver antennas are sequentially selected by the antenna switch and input into the receiver in a time-division manner.

However, the technology of the cited Non-Patent Document has a problem that, since the same number of receivers as antennas are placed to correspond to the respective receiver antennas, the circuit scale becomes great, making it difficult to reduce the size of the radar device and increasing power consumption.

Also, time-division operation as that in the technique of the cited Patent Document may cause a possibility that, due to a time lag generated among the signals received by the receiver from the receiver antennas, an error may occur in detection of an arrival angle when the object moves. Specifically, assume for example that an electric wave having a frequency of 60 [GHz] is transmitted from a transmitter antenna and reception signals are input into one receiver from two receiver antennas apart 2.5 [mm] from each other by a time division of every 1 [ms]. Assume also that the object is moving toward the receiver antennas at a speed of 2.5 [m/s]. In this case, since the signal received by one of the receiver antennas is behind the signal received by the other receiver antenna by 1 [ms], a signal after the object has moved 2.5 [mm] is to be received from the other receiver antenna. Since the wavelength λ of the 60 [GHz] signal is 5 [mm], the reception signals are to be 180 [deg.] out of phase from each other. In computation of the arrival angle, therefore, while it is expected that the phase difference between the two antennas is 0 [deg.] and thus the arrival angle is 0 [deg.] when the object is present in front of the receiver antennas, the calculated result of the arrival angle will be 90 [deg.] greatly deviated from the expected value.

To reduce the deviation of the arrival angle, it is thought that the switching between the receiver antennas should be sped up to reduce the time difference between the reception signals. Speeding up the switching between the receiver antennas however requires high-speed switching processing and high-speed data processing, causing problems of increase in circuit scale and increase in power consumption. Even when high-speed switching processing is achieved, it is unable to make the time lag zero, leaving the problem of an angle detection error due to asynchronism unsolved.

In view of the above problems, an objective of the present disclosure is achieving size reduction and cost reduction of a radar device, and also achieving low power consumption while fulfilling both simplification of signal processing and enhanced precision of angle detection (2D or 3D detection).

SUMMARY

According to one mode of the present disclosure, a radar device includes: a first receiver antenna outputting a first reception signal; a second receiver antenna outputting a second reception signal, placed apart from the first receiver antenna by a first distance in a first direction; a third receiver antenna outputting a third reception signal, placed apart from the first receiver antenna by a second distance in a second direction intersecting the first direction; a first receiver circuit processing the first reception signal; and a second receiver circuit selecting one of the second reception signal and the third reception signal and processing the selected signal.

According to the above mode, since individual receiver circuits are not provided for the second receiver antenna and the third receiver antenna, the circuit scale is reduced compared to the cited Non-Patent Document, whereby both size reduction and low power consumption can be achieved.

According to another mode of the present disclosure, a radar device includes: a first receiver antenna outputting a first reception signal; a second receiver antenna outputting a second reception signal, placed apart from the first receiver antenna by a first distance in a first direction; a third receiver antenna outputting a third reception signal, placed apart from the first receiver antenna by a second distance in a second direction perpendicular to the first direction; a fourth receiver antenna outputting a fourth reception signal, placed apart from the second receiver antenna by the second distance in the second direction and apart from the third receiver antenna by the first distance in the first direction; a first switch circuit selecting one of the first reception signal, the second reception signal, and the third reception signal and outputting the selected signal; a second switch circuit selecting one of the second reception signal, the third reception signal, and the fourth reception signal and outputting the selected signal; and a signal processor processing an output signal of the first switch circuit and an output signal of the second switch circuit.

According to the above mode, since individual receiver circuits are not provided for the four receiver antennas and signals selected by the first switch circuit and the second switch circuit are processed, the circuit scale is reduced compared to the cited Non-Patent Document, whereby both size reduction and low power consumption can be achieved.

Also, since the output from the first switch circuit and the output from the second switch circuit are signals simultaneously received from two receiver antennas, it is possible to avoid occurrence of an angle detection error caused by a lag in the receiving time of reflected waves due to switching between receiver antennas.

According to yet another mode of the present disclosure, a position detection system includes: a first receiver antenna outputting a first reception signal; a second receiver antenna outputting a second reception signal, placed apart from the first receiver antenna by a first distance in a first direction; a third receiver antenna outputting a third reception signal, placed apart from the first receiver antenna by a second distance in a second direction perpendicular to the first direction; a fourth receiver antenna outputting a fourth reception signal, placed apart from the second receiver antenna by the second distance in the second direction and apart from the third receiver antenna by the first distance in the first direction; and a signal processor, wherein the signal processor has a first operation mode of receiving and processing the first reception signal and the second reception signal, a second operation mode of receiving and processing the first reception signal and the third reception signal, a third operation mode of receiving and processing the first reception signal and the fourth reception signal, and a fourth operation mode of receiving and processing the second reception signal and the third reception signal, 3D coordinates of a target are calculated from processed results of the first operation mode and the second operation mode, and 3D coordinates of the target are calculated from processed results of the third operation mode and the fourth operation mode.

According to the above mode, as in the case of the above radar device, since individual receiver circuits are not provided for the four receiver antennas, the circuit scale is reduced compared to the cited Non-Patent Document, whereby both size reduction and low power consumption can be achieved.

Also, in each of the first to fourth operation modes, since the reception signals received simultaneously from two receiver antennas are processed, it is possible to avoid occurrence of an angle detection error caused by a lag in the receiving time of reflected waves due to switching between receiver antennas.

Moreover, according to this mode, the 3D coordinates of the target are calculated from the processed results of the first operation mode and the second operation modes, and the 3D coordinates of the target are calculated from the processed results of the third operation mode and the fourth operation modes. Therefore, while three-time sensing processing is required in the cited Patent Document since time-division processing is performed for each of three receiver antennas, only two-time sensing processing is required for the calculations of the 3D coordinates in this mode. This can reduce the processing time.

According to the present disclosure, it is possible to achieve size reduction and cost reduction of a radar device, and also achieve low power consumption while fulfilling both simplification of signal processing and enhanced precision of angle detection (2D or 3D detection).

BRIEF DESCRIPTION OF THE DRAWINGS

FIG. 7 is a block diagram showing a configuration of a radar device of Alteration 2 according to the first embodiment.

FIG. 14A is a view for explaining detection areas of a position detection system.

FIG. 15A is a view showing an operation example of a position detection system of the second embodiment.

FIG. 15B is another view showing an operation example of the position detection system of the second embodiment.

DETAILED DESCRIPTION

Embodiments of the present disclosure will be described hereinafter with reference to the accompanying drawings. It is to be noted that various specific numerical values presented in the following embodiments are merely illustrative for easy understanding of the invention and by no means intended to limit the scope of the invention.

First Embodiment

—Configuration of Radar Device—

Figure 1:
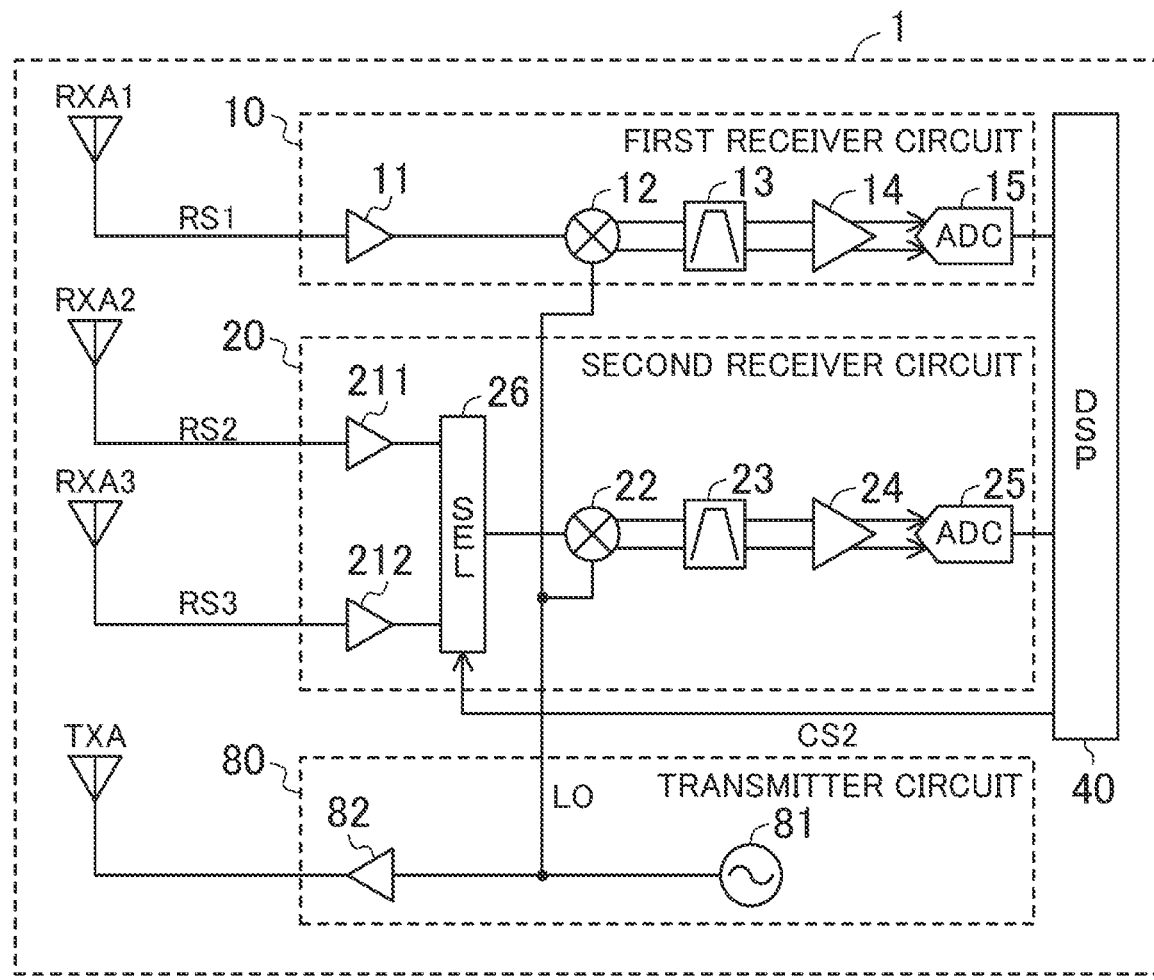
FIG. 1 is a block diagram showing a configuration of a radar device according to the first embodiment.

FIG. 1 is a block diagram showing a configuration example of a radar device 1 of the first embodiment.

The radar device 1 according to this embodiment is applied to position detection systems such as one detecting the presence of a person and the position (direction and distance) of the person within a predetermined range from the radar device in a thermostat, for example, and one detecting a gesture of a person.

As shown in FIG. 1, the radar device 1 includes: a transmitter antenna TXA for transmitting an electric wave toward a target that is to be an object of position detection (hereinafter simply called the target); and a transmitter circuit 80 supplying a signal on which the electric wave is based to the transmitter antenna TXA. The electric wave transmitted from the transmitter antenna TXA is a wave in the GHz band, for example.

The transmitter circuit 80 includes: a PLL 81 generating a local oscillating signal LO; and a power amplifier 82 amplifying the transmission signal output from the PLL 81 and supplying the amplified signal to the transmitter antenna TXA. Since a known configuration can be used for the PLL 81 and the power amplifier 82, detailed description on these components are omitted here.

The radar device 1 further includes a first receiver antenna RXA1, a second receiver antenna RXA2, a third receiver antenna RXA3, a first receiver circuit 10, a second receiver circuit 20, and a digital signal processor (DSP) 40.

The first receiver antenna RXA1 receives a reflected wave of the electric wave transmitted from the transmitter antenna TXA, reflected by the target (hereinafter simply called the reflected wave), and outputs a first reception signal RS1. The second receiver antenna RXA2 receives the reflected wave and outputs a second reception signal RS2. The third receiver antenna RXA3 receives the reflected wave and outputs a third reception signal RS3. The first reception signal RS1, the second reception signal RS2, and the third reception signal RS3 are signals in the GHz band, for example.

Figure 2A:
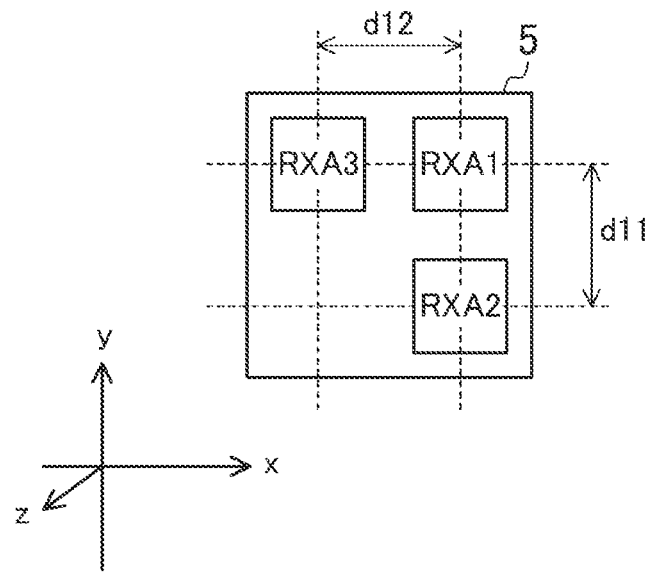
FIG. 2A is a view showing a placement example of receiver antennas in the first embodiment.

As shown in FIG. 2A, the first receiver antenna RXA1 and the second receiver antenna RXA2 are placed in the same plane with a predetermined distance d11 (corresponding to the first distance) from each other in a predetermined first direction (Y direction in FIG. 2A). Specifically, the first receiver antenna RXA1 and the second receiver antenna RXA2 are placed on the surface of a package in which the radar device 1 is housed or on the surface of a module substrate on which components of the radar device 1 are mounted, whereby they are in the same plane. The same holds true for placement of other receiver antennas RXA to be described later. Note that, in the drawings, the above package and substrate are collectively called a sensor substrate 5.

The first receiver antenna RXA1 and the third receiver antenna RXA3 are placed in the same plane with a predetermined distance d12 (corresponding to the second distance) from each other in a second direction (X direction in FIG. 2A) perpendicular to the first direction.

Note that the distance d between receiver antennas as used in the present disclosure refers to the distance between the centers of gravity of the receiver antennas. For example, the expression that the first receiver antenna RXA1 and the second receiver antenna RXA2 are apart from each other by the distance d11 indicates that the distance between the center of gravity of the first receiver antenna RXA1 and the center of gravity of the second receiver antenna RXA2 is d11. The same holds true for the distances between other receiver antennas RXA in the present disclosure.

That is, the first to third receiver antennas RXA1 to RXA3 are placed so that the centers of gravity of these antennas are at the vertices of a right triangle of which two sides are d11 and d12. The first receiver antenna RXA1 is located at the right angle vertex. When the distance d11 and the distance d12 are equal to each other, as shown in FIG. 2A, the first to third receiver antennas RXA1 to RXA3 are placed so that the centers of gravity of these antennas are at the vertices of an isosceles right triangle. By making the distance d11 and the distance d12 equal to each other in this way, two arrival angles θ can be detected with the same precision.

Referring back to FIG. 1, the first receiver circuit 10 includes a low noise amplifier circuit (LNA) 11, a mixer 12, a filter circuit 13, an amplifier circuit 14, and an ADC 15.

The LNA 11 amplifies, at low noise, the first reception signal RS1 received from the first receiver antenna RXA1 and outputs the amplified signal to the mixer 12. The mixer 12 mixes the output signal of the LNA 11 with the local oscillating signal LO branched from the transmission signal generated by the PLL 81, and generates first beat signals that are differential signals. The first beat signals are subjected to removal of an unnecessary band by the filter circuit 13, amplified by the amplifier circuit 14, and then analog-to-digital converted by the ADC 15.

The second receiver circuit 20 includes a low noise amplifier circuit (LNA) 211, a low noise amplifier circuit (LNA) 212, a switch circuit 26, a mixer 22, a filter circuit 23, an amplifier circuit 24, and an ADC 25.

The LNA 211 amplifies, at low noise, the second reception signal RS2 received from the second receiver antenna RXA2 and outputs the amplified signal to the switch circuit 26. The LNA 212 amplifies, at low noise, the third reception signal RS3 received from the third receiver antenna RXA3 and outputs the amplified signal to the switch circuit 26. The switch circuit 26 selects one of the output signal of the LNA 211 and the output signal of the LNA 212 based on an antenna control signal CS2 from the DSP 40, and outputs the selected signal to the mixer 22. The mixer 22 mixes the output signal of the switch circuit 26 with the local oscillating signal LO output from the PLL 81, and outputs second beat signals that are differential signals. The second beat signals are subjected to removal of an unnecessary band by the filter circuit 23, amplified by the amplifier circuit 24, and then analog-to-digital converted by the ADC 25. The switching operation by the switch circuit 26 will be described later together with the operation of the radar device 1.

The DSP 40 performs receiving processing for the digital signal AD-converted by the ADC 15 and the digital signal AD-converted by the ADC 25. Specific details of the receiving processing by the DSP 40 will be described later. The DSP 40 is an example of signal processors. As such a signal processor, a microcomputer may be used in place of the DSP 40. The same holds true for the second embodiment and the third embodiment to be described later.

As described above, in this embodiment, individual receiver circuits are not provided for the second receiver antenna RXA2 and the third receiver antenna RXA3. This reduces the circuit scale compared to the cited Non-Patent Document, permitting achievement of size reduction and also low power consumption. Also, with the configuration of this embodiment, it is possible to avoid occurrence of an angle detection error caused by a lag in the receiving time of reflected waves due to switching between the receiver antennas, which will be descried in detail later.

Although not illustrated, as the local oscillating signal LO, an LOI signal and an LOQ signal having a 90-deg. phase difference may be generated using an IQ generator circuit. In this case, in the first receiver circuit 10, for example, a quadrature mixer may be used as the mixer 12, and mix the reception signal with the LOI signal and with the LOQ signal to generate an I beat signal and a Q beat signal, respectively. In the ADC 15, the I and Q beat signals may be individually digitized. In this way, by separating the IQ signals, the detection precision is improved. The same holds true for the second receiver circuit 20, and also for the second and third embodiments to be descried later.

While the switch circuit 26 is used in this embodiment, switching between the reception signals may be performed without use of the switch circuit 26. That is, (1) when the signal from the second receiver antenna RXA2 is to be received, the LNA 211 may be made active and the LNA 212 may be powered down, and (2) when the signal from the third receiver antenna RXA3 is to be received, the LNA 211 may be powered down and the LNA 212 may be made active. With this configuration, the power of a circuit that is not receiving a signal can be reduced. The same holds true for switch circuits 36, 161, 162, 261, and 262 to be described later, in which an LNA connected to a receiver antenna receiving a signal may be made active and any other LNA may be powered down, to perform switching between reception signals without use of a switch circuit.

—Operation of Detection System—

The detection system according to this embodiment will be described hereinafter.

Also, the reason why occurrence of an angle detection error caused by a lag in the receiving time of reflected waves is avoided will be described using a specific example.

In the following description, it is assumed that the distances d11 and d12 between the antennas are both 2.5 [mm]. When the frequency of the transmission electrical wave is 60 [GHz], the distances d11 and d12 are $\lambda/2$ where $\lambda$ is the wavelength of the transmission electrical wave. Note that, while it is herein assumed that the distances d11 and d12 are equal to each other, the distances d11 and d12 may be made different from each other. In this case, also, similar effects to those obtained when the distances are equal to each other can be obtained. The same holds true for the distances d between receiver antennas RXA in the second and third embodiments.

The detection system of this embodiment calculates the 3D coordinates of the target based on the results of processing in a first operation mode and a second operation mode.

In the first operation mode, the first reception signal RS1 is processed in the first receiver circuit 10. Also, in the second receiver circuit 20, the second reception signal RS2 is selected by the switch circuit 26 and processed in the subsequent circuits.

In the second operation mode, the first reception signal RS1 is processed in the first receiver circuit 10. Also, in the second receiver circuit 20, the third reception signal RS3 is selected by the switch circuit 26 and processed in the subsequent circuits.

Figure 3A:
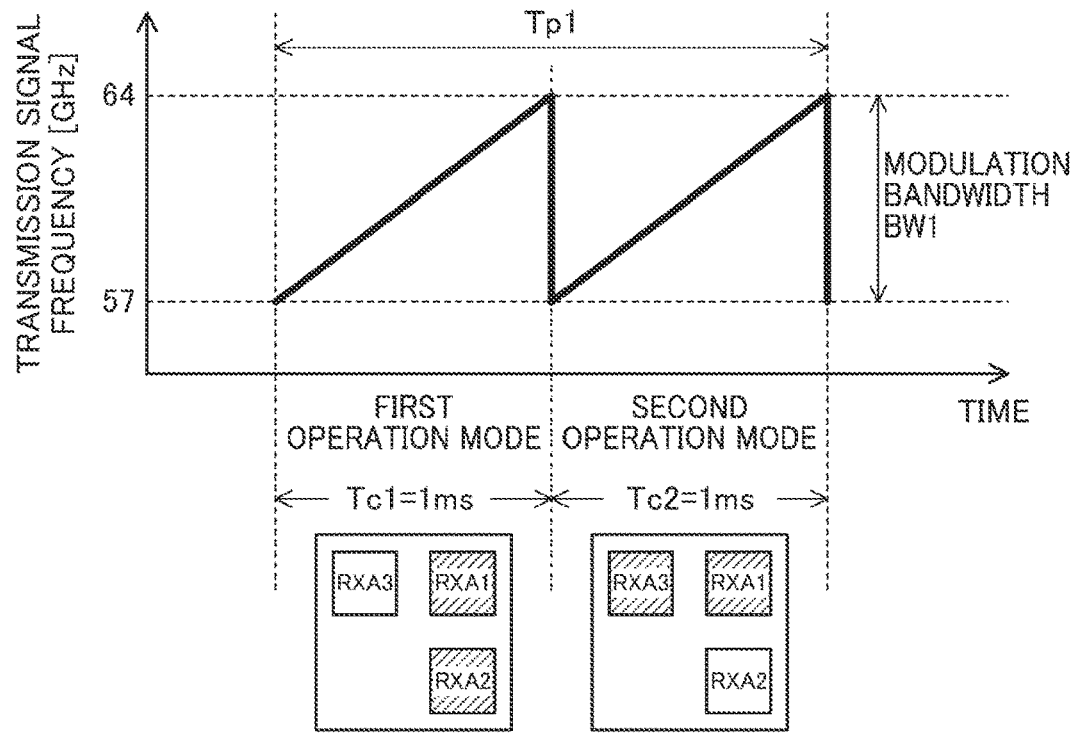
FIG. 3A is a view showing an operation example of the radar device according to the first embodiment.
Figure 3B:
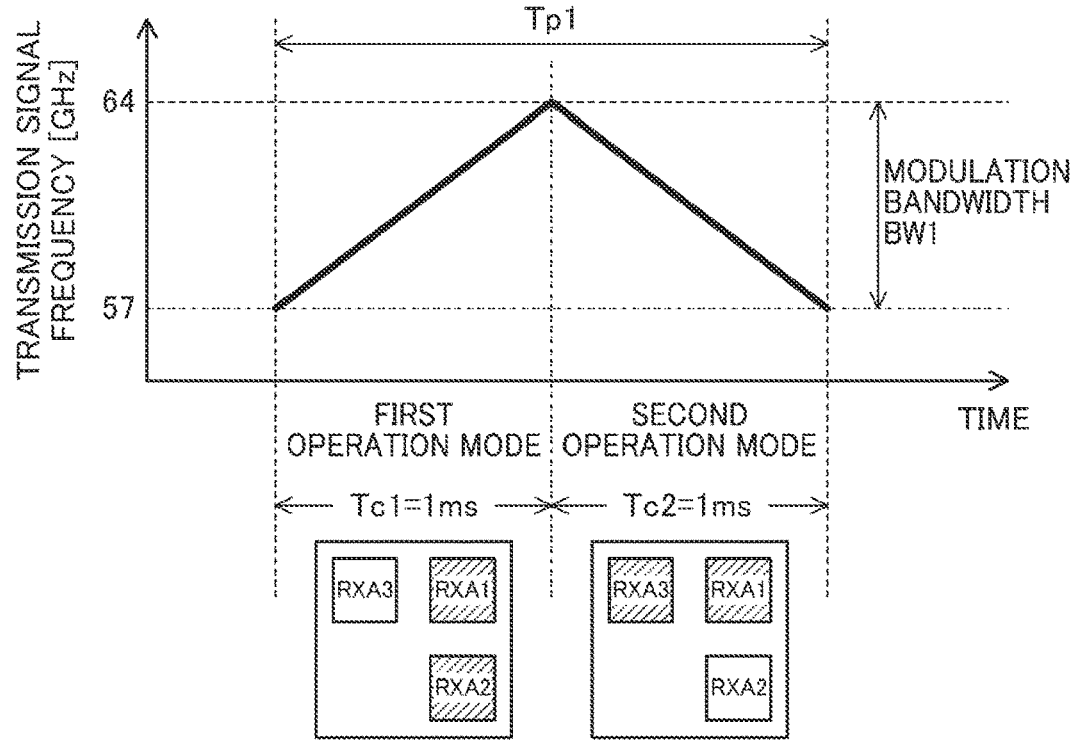
FIG. 3B is a view showing another operation example of the radar device according to the first embodiment.

FIGS. 3A and 3B show examples of time-division processing of the first operation mode and the second operation mode in a predetermined time period Tp1, in which an FMCW signal linearly sweeping from 57 [GHz] to 64 [GHz] during 1 [ms] is transmitted from the transmitter antenna TXA. In the example of FIG. 3A, as the first operation mode, processing is performed under an up-chirp transmission frequency sweep during time Tc1 (e.g., 1 [ms]) and thereafter, as the second operation mode, processing is performed under an up-chirp transmission frequency sweep during time Tc2 (e.g., 1 [ms]), whereby the 3D coordinates of the target is determined. Note that the waveform of the electric wave transmitted from the transmitter antenna TXA (hereinafter also called the transmission electrical wave) is not limited to the one in FIG. 3A. For example, in each of the operation modes, the sweep frequencies, and the sweep times Tc1 and Tc2, may be different from each other. Also, as shown in FIG. 3B, a down-chirp transmission frequency sweep may be used for the second operation mode. This may also be applied to the first operation mode. In place of the FMCW signal, a pulse signal may be used as the electric wave transmitted from the transmitter antenna TXA.

As is found from FIGS. 3A and 3B, while three-time sensing processing is required when three receiver antennas are used in the cited Patent Document since time-division processing corresponding to each of the receiver antennas is necessary, the configuration of this embodiment only requires two-time sensing processing.

<Sensing Processing>

The sensing processing will be described specifically using FIGS. 4A to 4E.

[First Operation Mode]

First, in the DSP 40, the first operation mode is set, in which the output signal of the LNA 211 is selected as the output of the switch circuit 26 via the antenna control signal CS2. In this way, the DSP 40 acquires the signals from the first receiver antenna RXA1 and the second receiver antenna RXA2.

The DSP 40 then performs range-FFT processing for the digital signal converted from the first reception signal RS1 by the first receiver circuit 10 and the digital signal converted from the second reception signal RS2 by the second receiver circuit 20, and determines complex data at a frequency fb corresponding to a distance R1 between the radar device 1 (sensor substrate 5) and the target for each of the first reception signal RS1 and the second reception signal RS2. The distance R1 from the radar device 1 to the target is expressed by Equation (1):

$$R1 = \frac{c \times Tc1 \times fb}{2 \times BW1} \quad (1)$$

where c is the speed of light, BW1 is the modulation bandwidth of the FMCW signal, and Tc1 is the sensing time.

Figure 4A:
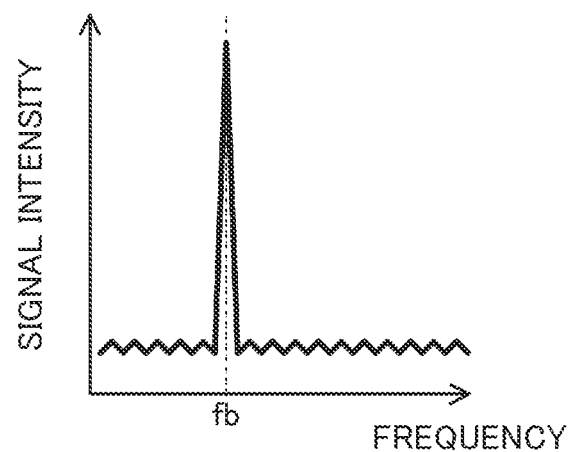
FIG. 4A is a view showing an example of an FFT spectrum of a digital signal output from a receiver circuit.

FIG. 4A shows a spectrum example obtained after the digital signal converted from the first reception signal RS1 by the first receiver circuit 10 has been subjected to range-FFT processing. In FIG. 4A, the signal intensity is high at the frequency fb corresponding to the distance R1. The frequency fb is expressed by Equation (2):

$$fb = \frac{2 \times R1}{c} \times \frac{BW1}{Tc1} \quad (2)$$

Figure 4B:
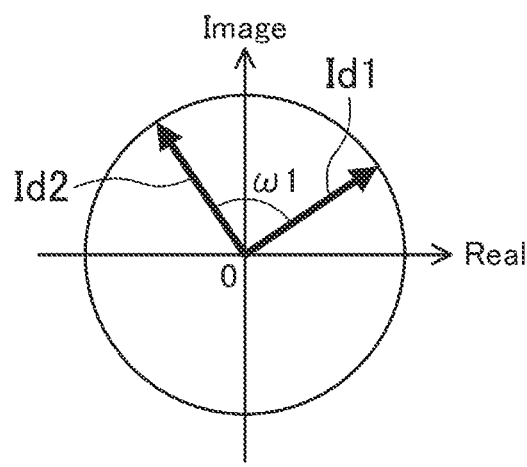
FIG. 4B is a view for explaining receiving processing of the radar device.

The DSP 40 then calculates a phase difference ω1 between the two signals from complex data Id1 of the signal from the first receiver antenna RXA1 at the frequency fb corresponding to the distance R1 and complex data Id2 of the signal from the second receiver antenna RXA2 at the frequency fb corresponding to the distance R1. FIG. 4B shows the relationship among the standardized complex data Id1 and Id2 and the phase difference ω1 on a complex plane.

DSP 40 then determines a first arrival angle θ1, which is an arrival angle in the first operation mode, from the phase difference ω1 using Equation (3):

$$\theta 1 = \sin^{-1}\left(\frac{\omega 1 \times \lambda}{2\pi \times d11}\right) \quad (3)$$

where $\lambda$ is the wavelength of the transmission electrical wave.

Figure 4C:
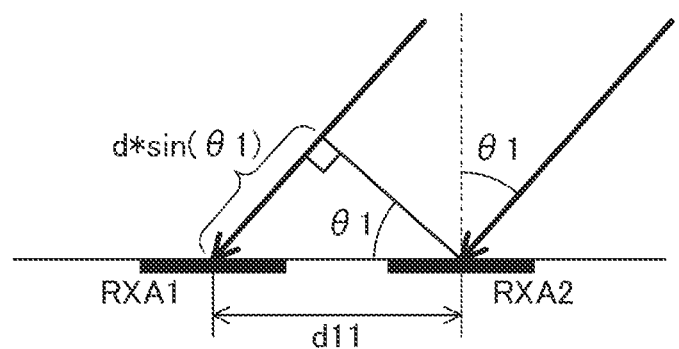
FIG. 4C is another view for explaining receiving processing of the radar device.

FIG. 4C illustrates the relationship between the first arrival angle θ1 and the phase difference ω1 in the first operation mode, which is expressed by Equation (4):

$$\omega 1 = \frac{2\pi \times d11 \times \sin\theta 1}{\lambda} \quad (4)$$

As described above, in the first operation mode, since the signals are being received simultaneously from the first receiver antenna RXA1 and the second receiver antenna RXA2, an angle detection error caused by a lag in the receiving time of reception signals, which occurs in the cited Patent Document, will not occur. Therefore, it is unnecessary to perform high-speed switching processing and high-speed data processing for reducing the angle detection error, whereby the circuit scale and the power consumption are prevented from increasing. The same holds true for the second operation mode to follow and also for a third operation mode and a fourth operation mode to be described later.

[Second Operation Mode]

In the DSP 40, after the processing of the first operation mode is finished, the second operation mode is set, in which the output signal of the LNA 212 is selected as the output of the switch circuit 26 via the antenna control signal CS2. Therefore, the DSP 40 acquires the signals from the first receiver antenna RXA1 and the third receiver antenna RXA3.

Thereafter, as in the case of the first operation mode, the DSP 40 performs range-FFT processing for the digital signal converted from the first reception signal RS1 by the first receiver circuit 10 and the digital signal converted from the third reception signal RS3 by the second receiver circuit 20. The DSP 40 then calculates a phase difference ω2 between the first reception signal RS1 and the third reception signal RS3 from the complex data Id1 of the signal from the first receiver antenna RXA1 at the frequency fb corresponding to the distance R1 and complex data Id3 of the signal from the third receiver antenna RXA3 at the frequency fb corresponding to the distance R1.

DSP 40 then determines a second arrival angle θ2, which is an arrival angle in the second operation mode, from the phase difference ω2 using Equation (5):

$$\theta 2 = \sin^{-1}\left(\frac{\omega 2 \times \lambda}{2\pi \times d12}\right) \quad (5)$$

Figure 4D:
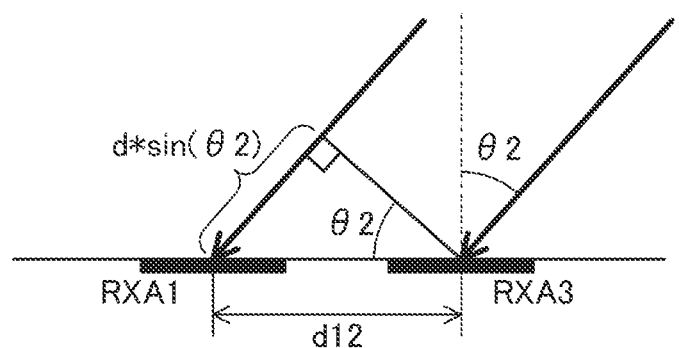
FIG. 4D is yet another view for explaining receiving processing of the radar device.

FIG. 4D illustrates the relationship between the second arrival angle θ2 and the phase difference ω2 in the second operation mode, which is expressed by Equation (6):

$$\omega 2 = \frac{2\pi \times d12 \times \sin\theta 2}{\lambda} \quad (6)$$

<Calculation of 3D Coordinates>

Figure 4E:
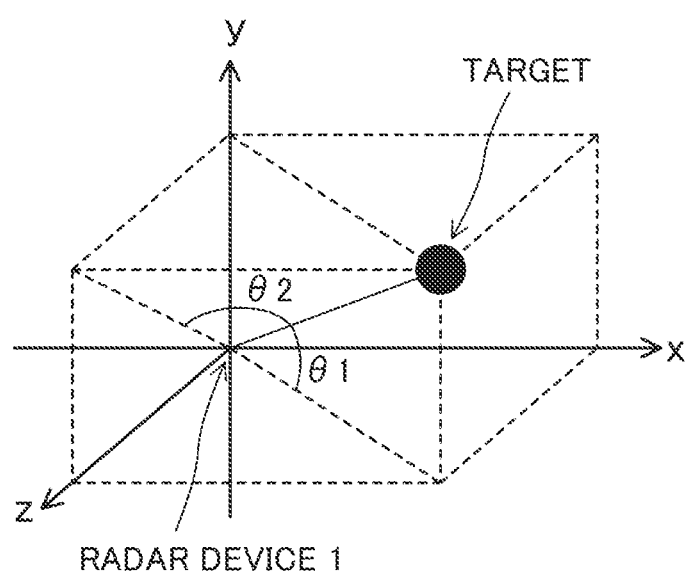
FIG. 4E is yet another view for explaining receiving processing of the radar device.

After the processing of the first operation mode and the second operation mode is finished, the 3D coordinates of the target is determined from the first arrival angle θ1 and the second arrival angle θ2 at the distance R1 as shown in FIG. 4E.

Figure 5:
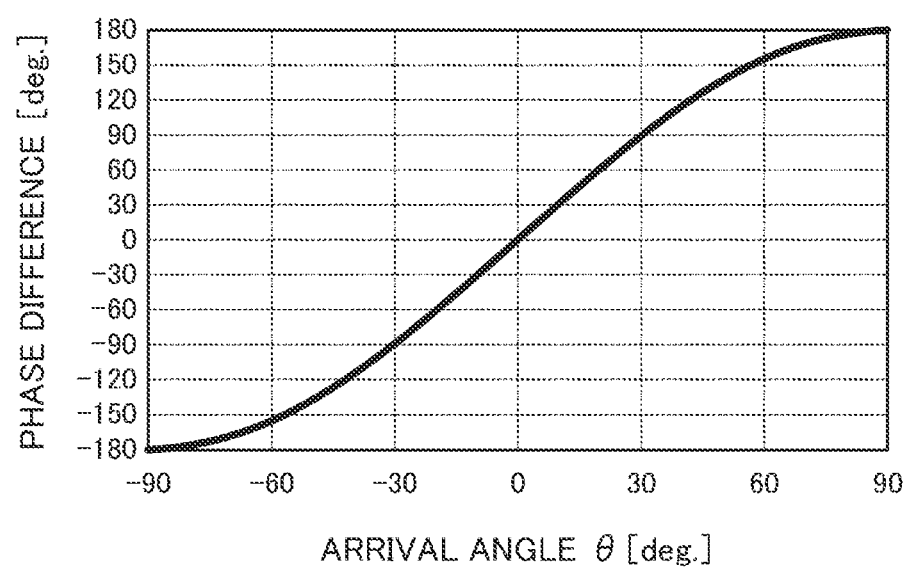
FIG. 5 is a view for explaining detection results of an object by the radar device according to the first embodiment.

FIG. 5 shows the relationship between the arrival angle θ and the phase difference ω, i.e., the relationship between the first arrival angle θ1 and the phase difference ω1, or the relationship between the second arrival angle θ2 and the phase difference ω2.

The first operation mode and the second operation mode are continuously operated and the time of the first operation mode is as short as about 1 [ms], for example. Therefore, the distance R1 to the target does not substantially change between the first operation mode and the second operation mode. This means that the first arrival angle θ1 and the second arrival angle θ2 are substantially the same in the first and second operation modes. Moreover, as described earlier, since the two reception signals used at the computation of each of the first and second arrival angles θ1 and θ2 are received simultaneously, the first and second arrival angles θ1 and θ2 can be calculated with no error. It is therefore possible to calculate the 3D coordinates of the target with high precision.

—Alteration 1—

Figure 6:
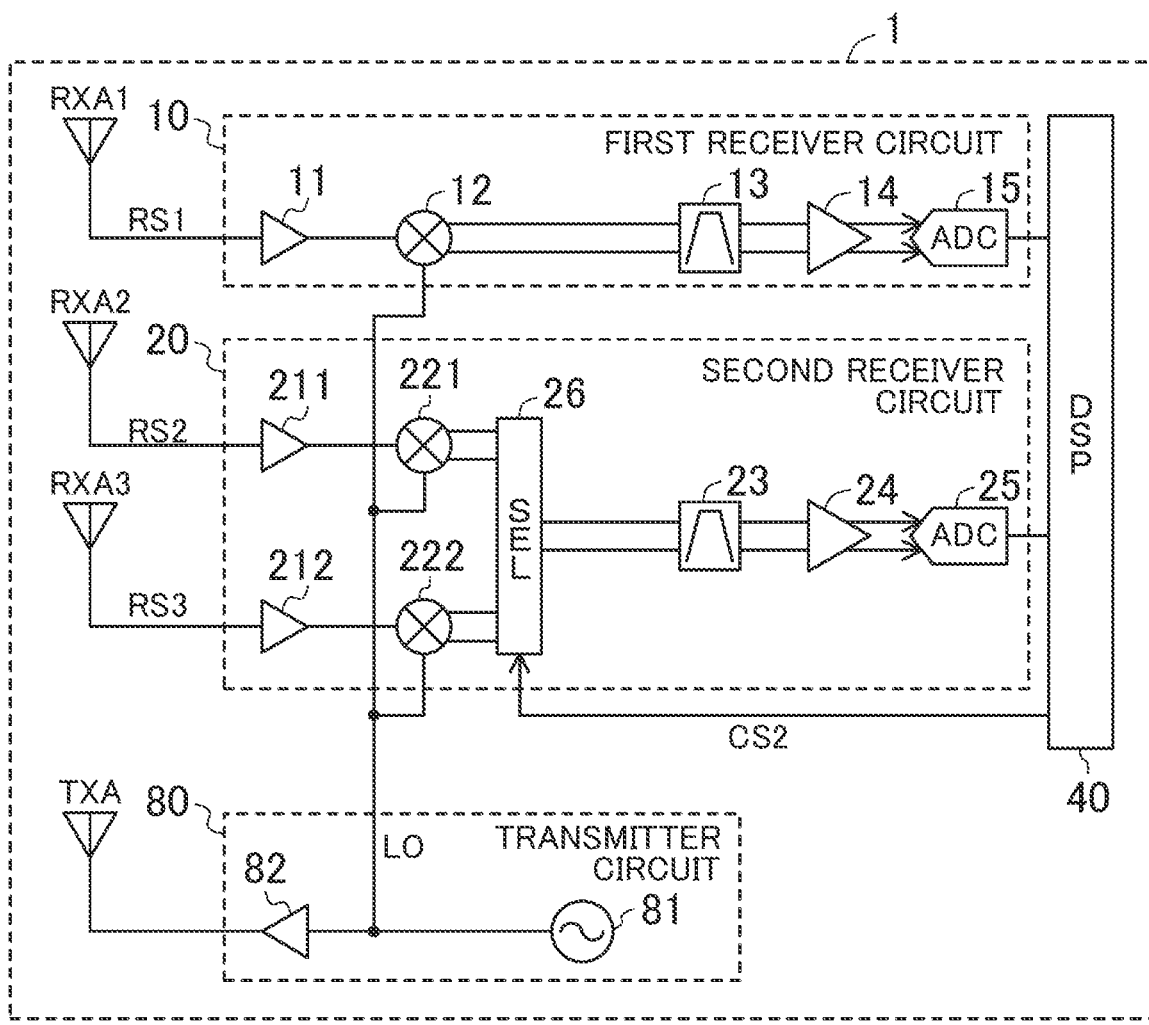
FIG. 6 is a block diagram showing a configuration of a radar device of Alteration 1 according to the first embodiment.

FIG. 6 is a block diagram showing a configuration example of a radar device 1 according to Alteration 1 of the first embodiment. In FIG. 6, components in common with FIG. 1 are denoted by common numerical characters, and description will be made centering on differences from the above embodiment.

In FIG. 6, in the second receiver circuit 20, the switch circuit 26 is placed downstream of mixers 221 and 222.

Specifically, in Alteration 1, the mixer 221 mixes the output signal of the LNA 211 with the local oscillating signal LO to generate beat signals and outputs the signals to the switch circuit 26. The mixer 222 mixes the output signal of the LNA 212 with the local oscillating signal LO to generate beat signals and outputs the signals to the switch circuit 26. The switch circuit 26 selects either the output signals of the mixer 221 or the output signals of the mixer 222 based on the antenna control signal CS2 from the DSP 40 and outputs the selected signals to the filter circuit 23.

In Alteration 1, also, the radar device 1 can determine the 3D coordinates of the target by executing similar operation and processing to the "Operation of Detection System" in the above embodiment. Also, in this alteration, since the switch circuit 26 performs switching between the beat signals output from the mixers 221 and 222, a slow switching speed is acceptable for the switch circuit 26. Therefore, the power consumption of the radar device 1 can be reduced.

—Alteration 2—

FIG. 7 is a block diagram showing a configuration example of a radar device 1 according to Alteration 2 of the first embodiment. In FIG. 7, components in common with FIG. 1 are denoted by common numerical characters, and description will be made centering on differences from the above embodiment and Alteration 1.

The radar device 1 of FIG. 7 includes a fourth receiver antenna RXA4, a fifth receiver antenna RXA5, and a third receiver circuit 30 in addition to the configuration of FIG. 1. The fourth receiver antenna RXA4 and the fifth receiver antenna RXA5 are placed in the same plane (e.g., on the surface of the sensor substrate 5) as the first to third receiver antennas RXA1 to RXA3.

The fourth receiver antenna RXA4 receives the reflected wave reflected from the target and outputs a fourth reception signal RS4. The fifth receiver antenna RXA5 receives the reflected wave and outputs a fifth reception signal RS5. The fourth reception signal RS4 and the fifth reception signal RS5 are signals in the GHz band, for example.

Figure 8A:
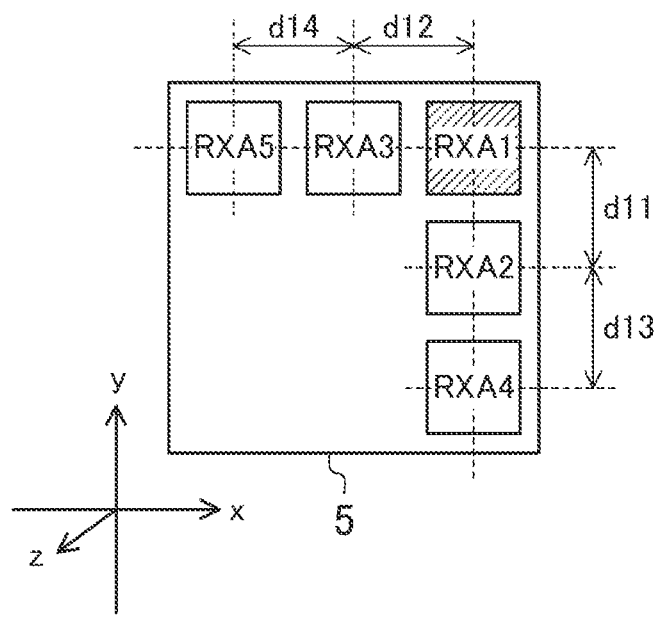
FIG. 8A is a view showing a placement example of receiver antennas used in the alteration of FIG. 7.
Figure 8B:
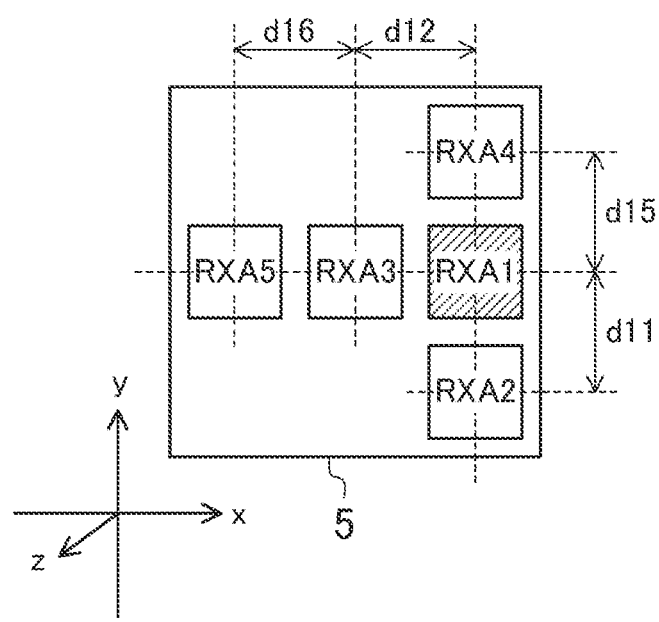
FIG. 8B is a view showing another placement example of receiver antennas used in the alteration of FIG. 7.
Figure 8C:
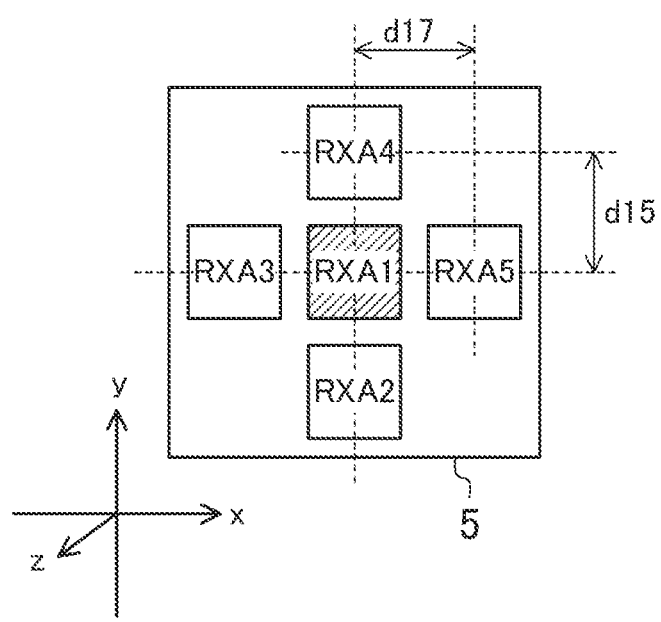
FIG. 8C is a view showing yet another placement example of receiver antennas used in the alteration of FIG. 7.

FIGS. 8A to 8C show placement examples of the first to fifth receiver antennas RXA1 to RXA5.

In FIG. 8A, in addition to the configuration of FIG. 2A, the fourth receiver antenna RXA4 is placed at a position apart from the second receiver antenna RXA2 by a distance d13 (corresponding to the third distance) in the first direction (Y direction in FIG. 8A), which is along the straight line passing through the center of gravity of the first receiver antenna RXA1 and the center of gravity of the second receiver antenna RXA2, on the side of the second receiver antenna RXA2 opposite to the first receiver antenna RXA1 side. The distance d13 may be the same as, or different from, the distance d11.

Also, the fifth receiver antenna RXA5 is placed at a position apart from the third receiver antenna RXA3 by a distance d14 (corresponding to the fourth distance) in the second direction (X direction in FIG. 8A), which is along the straight line passing through the center of gravity of the first receiver antenna RXA1 and the center of gravity of the third receiver antenna RXA3, on the side of the third receiver antenna RXA3 opposite to the first receiver antenna RXA1 side. The distance d14 may be the same as, or different from, the distance d12.

In FIG. 8B, the position of the fourth receiver antenna RXA4 is different from the placement of FIG. 8A. Specifically, in FIG. 8B, the fourth receiver antenna RXA4 is placed at a position apart from the first receiver antenna RXA1 by a distance d15 (corresponding to the third distance) in the first direction (Y direction in FIG. 8B) on the side of the first receiver antenna RXA1 opposite to the second receiver antenna RXA2 side.

In FIG. 8C, the position of the fifth receiver antenna RXA5 is different from the placement of FIG. 8B. Specifically, in FIG. 8C, the fifth receiver antenna RXA5 is placed at a position apart from the first receiver antenna RXA1 by a distance d17 (corresponding to the fourth distance) in the second direction (X direction in FIG. 8C) on the side of the first receiver antenna RXA1 opposite to the third receiver antenna RXA3 side.

Referring back to FIG. 7, the third receiver circuit 30 includes a low noise amplifier circuit (LNA) 311, a low noise amplifier circuit (LNA) 312, a switch circuit 36, a mixer 32, a filter circuit 33, an amplifier circuit 34, and an ADC 35.

The LNA 311 amplifies, at low noise, the fourth reception signal RS4 received from the fourth receiver antenna RXA4 and outputs the amplified signal to the switch circuit 36. The LNA 312 amplifies, at low noise, the fifth reception signal RS5 received from the fifth receiver antenna RXA5 and outputs the amplified signal to the switch circuit 36. The switch circuit 36 selects one of the output signal of the LNA 311 and the output signal of the LNA 312 based on an antenna control signal CS3 from the DSP 40 and outputs the selected signal to the mixer 32. The mixer 32 mixes the output signal of the switch circuit 36 with the local oscillating signal LO output from the PLL 81, and outputs third beat signals that are differential signals. The third beat signals are subjected to removal of an unnecessary band by the filter circuit 33, amplified by the amplifier circuit 34, and then analog-to-digital converted by the ADC 35. The DSP 40 performs receiving processing for the digital signal AD-converted by the ADC 35.

The flow of the operation as the detection system is the same as that in the above embodiment. In this alteration, therefore, description will be made centering on differences from the above embodiment. It is herein assumed that the distance d11 and the distance d13 are equal to each other, and the distance d12 and the distance d14 are equal to each other.

In Alteration 2, for example, in the first operation mode, in addition to the operation in the above embodiment, the fourth reception signal RS4 is selected by the switch circuit 36 based on the antenna control signal CS3 from the DSP 40 and processed in the subsequent circuits in the third receiver circuit 30. As a result, the DSP 40 acquires the first reception signal RS1, the second reception signal RS2, and the fourth reception signal RS4, and determines the first arrival angle θ1 based on these signals. The first arrival angle θ1 may be determined from the complex data of the signals from the receiver antennas at the frequency fb corresponding to the distance R1 using the reception signals from the paired antennas as in the above embodiment, or may be determined by an angle-FFT or Capon method.

Also, in Alteration 2, in the second operation mode, in addition to the operation in the above embodiment, the fifth reception signal RS5 is selected by the switch circuit 36 based on the antenna control signal CS3 from the DSP 40 and processed in the subsequent circuits in the third receiver circuit 30. As a result, the DSP 40 acquires the first reception signal RS1, the third reception signal RS3, and the fifth reception signal RS5, and determines the second arrival angle θ2 based on these signals. The second arrival angle θ2 may be determined in a manner similar to the above embodiment, including determining the complex data of the signals from the receiver antennas at the frequency fb corresponding to the distance R1.

The DSP 40 then determines the 3D coordinates of the target from the first arrival angle θ1 and the second arrival angle θ2 at the distance R1.

By increasing the number of antennas as in this alteration, the number of targets detectable simultaneously at the same distance can be increased, and also since the S/N of signals is improved by averaging, the detectable distance can be extended.

The distance d11 and the distance d13 may be different from each other. In this case, for example, the average value of an arrival angle θ11 determined from the first reception signal RS1 and the second reception signal RS2 and an arrival angle θ12 determined from the second reception signal RS2 and the fourth reception signal RS4 may be determined as the first arrival angle θ1. Similarly, the distance d12 and the distance d14 may be different from each other. In this case, the second arrival angle θ2 may be determined in a manner similar to the case of the first arrival angle θ1.

—Other Alterations—

While a reception signal from a receiver antenna (e.g., the receiver antenna RXA1) is amplified by an LNA (e.g., the LNA 11) in the above description, such an LNA (e.g., the LNA 11) is not necessarily required. In this case, a reception signal from a receiver antenna RXA (e.g., the first receiver antenna RXA1) may be directly input into a mixer (e.g., the mixer 12). The same holds true for the other receiver antennas RXA (RXA2 to RXA5). This also applies to the second embodiment and the third embodiment to be described later where LNAs are not necessarily required.

Figure 2B:
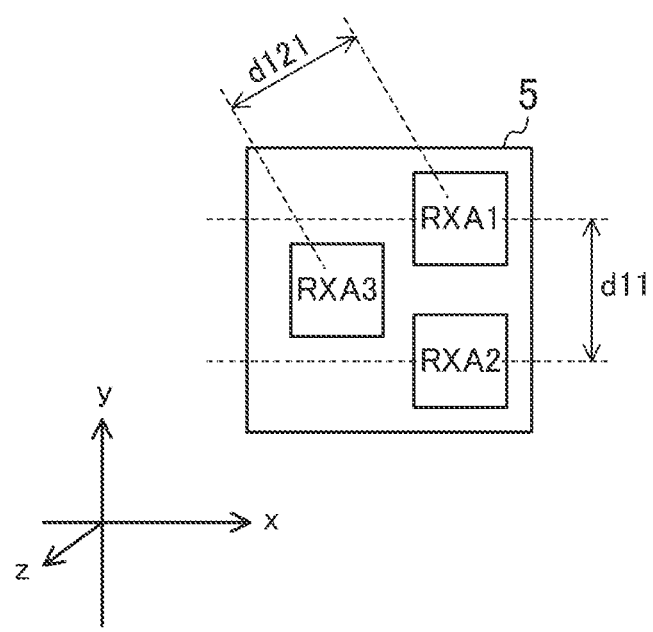
FIG. 2B is a view showing another placement example of receiver antennas in the first embodiment.

While the second receiver antenna RXA2 and the third receiver antenna RXA3 are placed at positions orthogonal to the first receiver antenna RXA1 as shown in FIG. 2A in the above description, the placement is not limited to this. For example, as shown in FIG. 2B, when the first receiver antenna RXA1 and the second receiver antenna RXA2 are placed apart from each other by the distance d11 in the Y direction, the third receiver antenna RXA3 may be placed apart from the first receiver antenna RXA1 by a predetermined distance d121 in a direction intersecting the Y direction. That is, the third receiver antenna RXA3 is placed so that its position in the X direction is displaced with respect to the first and second receiver antennas RXA1 and RXA2. In this case, also, similar effects to those obtained in the above embodiment can be obtained.

While the range-FFT processing is performed for two reception signals (converted digital signals) at the determination of complex data of the signals from the receiver antennas at the frequency fb corresponding to the distance R1 in the first and second operation modes in the above description, range-Doppler FFT processing may be performed for a plurality of sensing data to determine the 3D coordinates of the target. Detailed description on the range-Doppler FFT processing is omitted here because prior art can be used: for example, the cited Patent Document illustrates position detection processing using the range-Doppler FFT.

The range-FFT processing may otherwise be performed in the following manner Differential processing may be performed between latest sensing data and past sensing data preceding by a predetermined time, and the resultant differential-processed data may be subjected to the range-FFT processing to determine the 3D coordinates of the target. As for sensing data of a stationary object, the latest sensing data and the past sensing data are the same. Therefore, by performing the above differential processing, the influence of the stationary object can be removed, and only moving objects can be detected among targets within the detection range. The same holds true for the second embodiment and the third embodiment to be described later, in which position detection processing using the range-Doppler FFT may be performed, or the differential processing described above may be performed.

Second Embodiment

Figure 9:
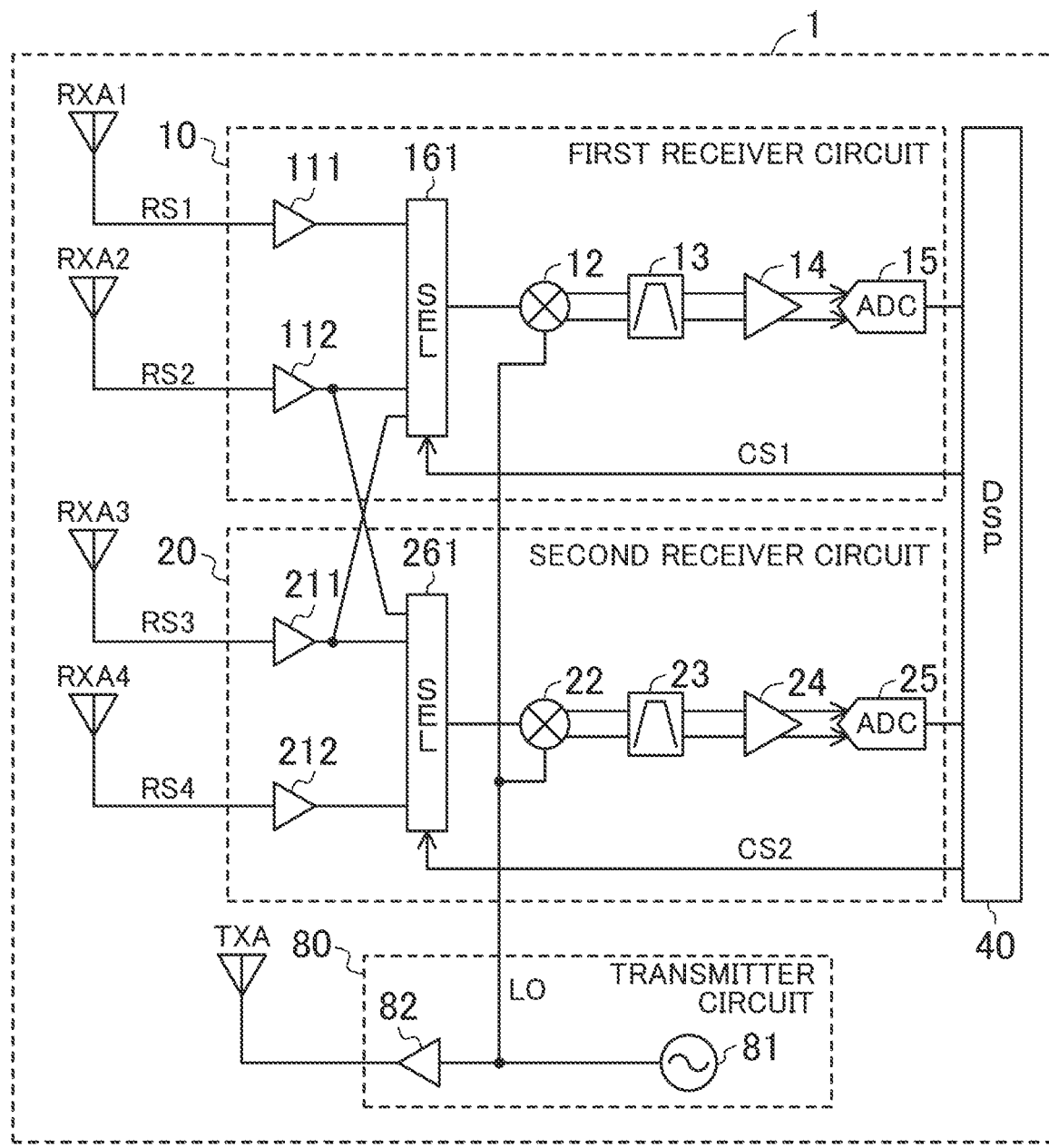
FIG. 9 is a block diagram showing a configuration of a radar device according to the second embodiment.

FIG. 9 is a block diagram showing a configuration example of a radar device 1 according to the second embodiment. In FIG. 9, components in common with FIG. 1 are denoted by common numerical characters, and description will be made centering on differences from the first embodiment.

Figure 10:
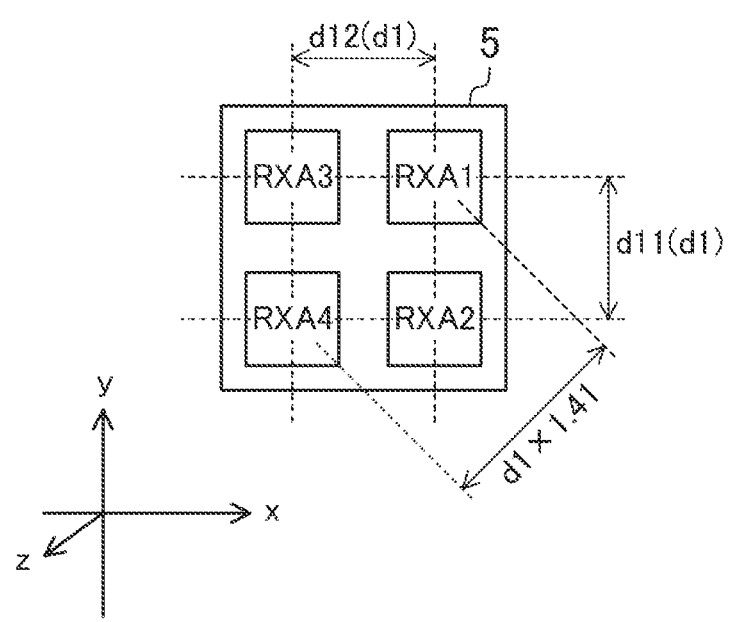
FIG. 10 is a view showing a placement example of receiver antennas in the second embodiment.

In this embodiment, a fourth receiver antenna RXA4 is provided in addition to the first to third receiver antennas RXA1 to RXA3 in the first embodiment. As shown in FIG. 10, the fourth receiver antenna RXA4 is placed apart from the second receiver antenna RXA2 by the distance d12 in the second direction (X direction in FIG. 10) and apart from the third receiver antenna RXA3 by the distance d11 in the first direction (Y direction in FIG. 10). FIG. 10 shows an example where the distance d11 and the distance d12 are equal to each other as a distance d1. In this case, the first to fourth receiver antennas RXA1 to RXA4 are placed so that their centers of gravity are at the vertexes of a square having a length of one side of d1. The distance d between the first receiver antenna RXA1 and the fourth receiver antenna RXA4, and the distance d between the second receiver antenna RXA2 and the third receiver antenna RXA3, are "d=d1×1.41." Assume here that the distance d1 is ½ of the wavelength λ of the transmission electrical wave transmitted from the transmitter antenna TXA. For example, when the transmission electrical wave is 60 [GHz], the distance d1 between receiver antennas in the X and Y directions is set at 2.5 [mm].

The distance d11 and the distance d12 may be different from each other. In this case, the first to fourth receiver antennas RXA1 to RXA4 are placed so that their centers of gravity are at the vertexes of a rectangle having lengths of two sides of d11 and d12.

Referring back to FIG. 9, a first receiver circuit 10 includes a low noise amplifier circuit (LNA) 111, a low noise amplifier circuit (LNA) 112, a switch circuit 161 (corresponding to the first switch circuit), a mixer 12, a filter circuit 13, an amplifier circuit 14, and an ADC 15.

The LNA 111 amplifies, at low noise, a first reception signal RS1 received from the first receiver antenna RXA1 and outputs the amplified signal to the switch circuit 161. The LNA 112 amplifies, at low noise, a second reception signal RS2 received from the second receiver antenna RXA2 and outputs the amplified signal to the switch circuit 161 and also to a switch circuit 261 to be described later. The switch circuit 161 selects one of the output signal of the LNA 111, the output signal of the LNA 112, and the output signal of an LNA 211 to be described later based on an antenna control signal CS1 from a DSP 40 and outputs the selected signal to the mixer 12. The configuration and operation of the mixer 12, the filter circuit 13, the amplifier circuit 14, and the ADC 15 are similar to those in the first embodiment.

A second receiver circuit 20 includes the LNA 211, an LNA 212, a switch circuit 261 (corresponding to the second switch circuit), a mixer 22, a filter circuit 23, an amplifier circuit 24, and an ADC 25.

In this embodiment, the LNA 211 amplifies, at low noise, a third reception signal RS3 received from the third receiver antenna RXA3 and outputs the amplified signal to the switch circuit 161 and also to the switch circuit 261. The LNA 212 amplifies, at low noise, a fourth reception signal RS4 received from the fourth receiver antenna RXA4 and outputs the amplified signal to the switch circuit 261. The switch circuit 261 selects one of the output signal of the LNA 112, the output signal of the LNA 211, and the output signal of the LNA 212 based on an antenna control signal CS2 from the DSP 40 and outputs the selected signal to the mixer 22. The configuration and operation of the mixer 22, the filter circuit 23, the amplifier circuit 24, and the ADC 25 are similar to those in the first embodiment.

As described above, in this embodiment, as in the first embodiment, individual receiver circuits are not provided for the receiver antennas RXA1 to RXA4. This reduces the circuit scale compared to the cited Non-Patent Document, permitting achievement of size reduction and low power consumption.

—Operation of Detection System—

The detection system according to this embodiment will be described hereinafter.

In the following description, it is assumed that the distance d11 between antennas in the Y direction and the distance d12 between antennas in the X direction are both 2.5 [mm]. So, the distance between the first receiver antenna RXA1 and the fourth receiver antenna RXA4, and the distance between the second receiver antenna RXA2 and the third receiver antenna RXA3, are about 3.5 [mm].

The detection system according this embodiment includes a third operation mode and a fourth operation mode in addition to the first operation mode and the second operation mode described in the first embodiment. The processing in the third and fourth operation modes is similar to that in the first and second operation modes. Herein, therefore, description will be made centering on differences from the first and second operation modes.

Figure 11:
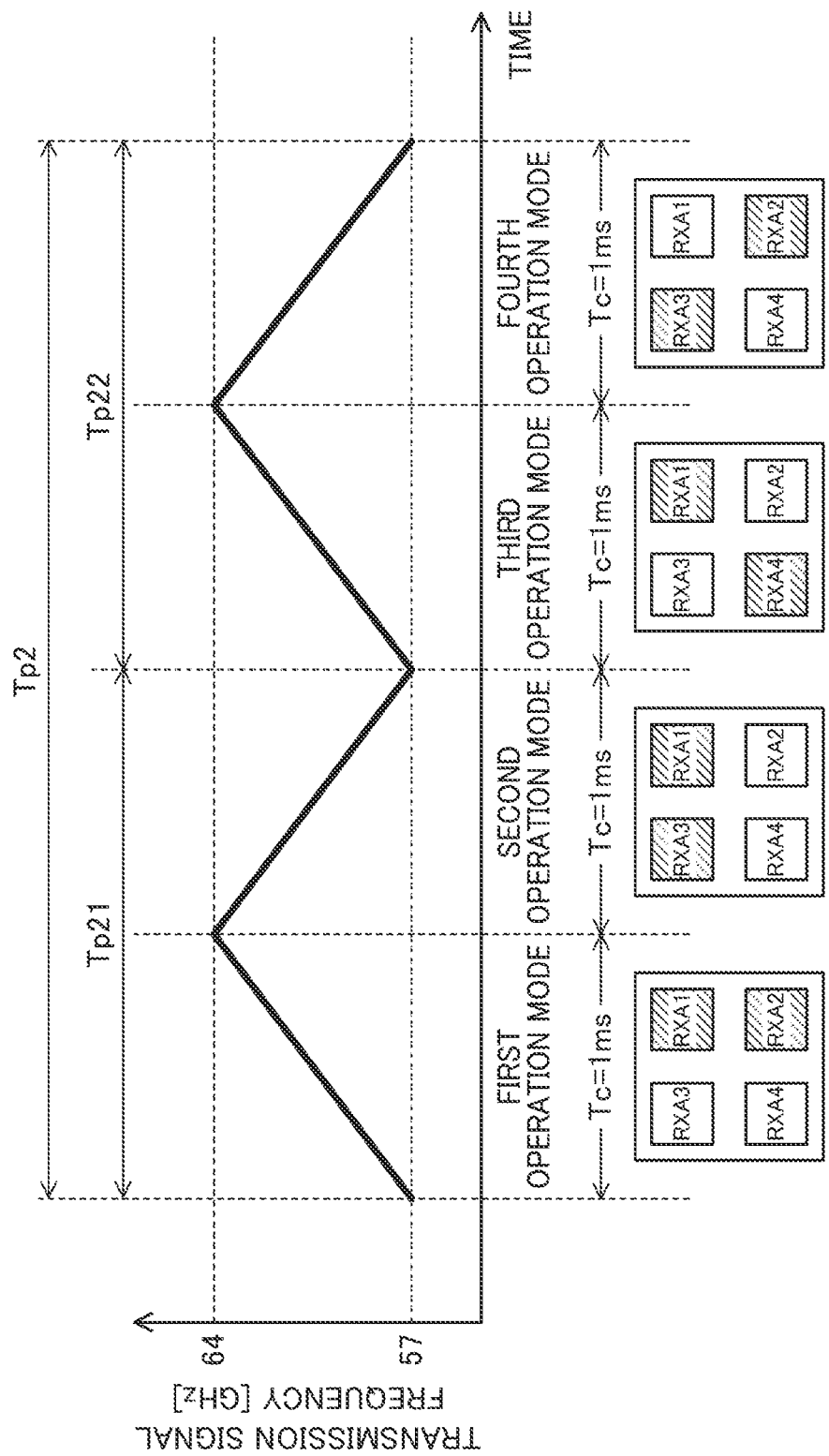
FIG. 11 is a view showing an operation example of the radar device according to the second embodiment.

FIG. 11 shows an example of time-division processing of the first operation mode to the fourth operation mode performed sequentially in a predetermined time period Tp2, in which an FMCW signal linearly sweeping from 57 [GHz] to 64 [GHz] during 1 [ms] is transmitted from the transmitter antenna TXA. In FIG. 11, in the first and third operation modes, an up-chirp transmission frequency sweep is performed during time Tc (e.g., 1 [ms]), and in the second and fourth operation modes, a down-chirp transmission frequency sweep is performed during time Tc (e.g., 1 [ms]). The sweep time Tc may be different among the operation modes. Also, the combination of down-chirp and up-chirp is not limited to that in FIG. 11.

[First Operation Mode]

In the first operation mode, the first reception signal RS1 is selected by the switch circuit 161 and processed in the subsequent circuits in the first receiver circuit 10. In the second receiver circuit 20, the second reception signal RS2 is selected by the switch circuit 261 and processed in the subsequent circuits. The DSP 40 performs the "sensing processing" described in the first embodiment to determine a first arrival angle θ1 as the arrival angle in the first operation mode.

[Second Operation Mode]

In the second operation mode, the first reception signal RS1 is selected by the switch circuit 161 and processed in the subsequent circuits in the first receiver circuit 10. In the second receiver circuit 20, the third reception signal RS3 is selected by the switch circuit 261 and processed in the subsequent circuits. The DSP 40 performs the "sensing processing" described in the first embodiment to determine a second arrival angle θ2 as the arrival angle in the second operation mode.

Thereafter, as in the first embodiment, the DSP 40 determines the 3D coordinates of the target from the first arrival angle θ1 and the second arrival angle θ2 at the distance R1 between the sensor substrate 5 and the target. Note that, in the following description, the time-division processing of the first operation mode and the second operation mode during a predetermined time (e.g., Tp21 in FIG. 11) is called a first time-division operation unit, and the detection operation of determining the 3D coordinates of the target based on the processed results of the first time-division operation unit is called first detection operation.

[Third Operation Mode]

In the third operation mode, the first reception signal RS1 is selected by the switch circuit 161 and processed in the subsequent circuits in the first receiver circuit 10. In the second receiver circuit 20, the fourth reception signal RS4 is selected by the switch circuit 261 and processed in the subsequent circuits. The DSP 40 performs the "sensing processing" described in the first embodiment to determine a third arrival angle θ3 as the arrival angle in the third operation mode.

[Fourth Operation Mode]

In the fourth operation mode, the second reception signal RS2 is selected by the switch circuit 161 and processed in the subsequent circuits in the first receiver circuit 10. In the second receiver circuit 20, the third reception signal RS3 is selected by the switch circuit 261 and processed in the subsequent circuits. The DSP 40 performs the "sensing processing" described in the first embodiment to determine a fourth arrival angle θ4 as the arrival angle in the fourth operation mode.

Thereafter, as in the first embodiment, the DSP 40 determines the 3D coordinates of the target from the third arrival angle θ3 and the fourth arrival angle θ4 at the distance R1 between the sensor substrate 5 and the target. Note that, in the following description, the time-division processing of the third operation mode and the fourth operation mode during a predetermined time (e.g., Tp22 in FIG. 11) is called a second time-division operation unit, and the detection operation of determining the 3D coordinates of the target based on the processed results of the second time-division operation unit is called second detection operation.

Note that, in the third operation mode and the fourth operation mode, although the axial line connecting the centers of gravity of the receiver antennas is at an angle of 45 degrees with respect to the X direction and the Y direction, calculation can also be done for these operation modes by performing similar processing to that in the first and second operation modes.

It is unnecessary to perform the four operation modes continuously as in FIG. 11. For example, the 3D coordinates of the target may be determined from only the first detection operation (the first and second operation modes) or only the second detection operation (the third and fourth operation modes). A specific example will be described later.

[Difference Between First Detection Operation and Second Detection Operation]

Differences between the first detection operation and the second detection operation will be described hereinafter. Assume herein that the transmission electrical wave from the transmitter antenna TXA is 60 [GHz] and the distance d1 between the receiver antennas RXA1 to RXA4 in the X and Y directions is 2.5 [mm].

The distance d between the receiver antennas used for the detection operation in the first operation mode and the second operation mode is "d=λ/2" where λ is the wavelength of the transmission electrical wave. The relationship between the arrival angle θ and the phase difference ω between the receiver antennas at this time is as represented by the solid line in FIG. 12 (same as FIG. 5).

Figure 12:
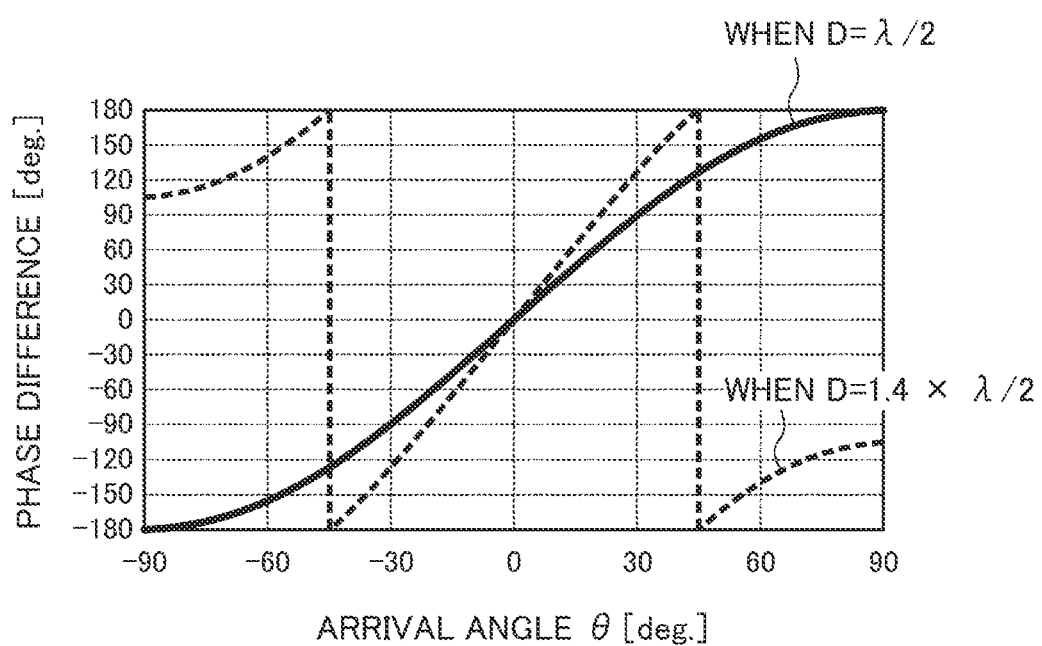
FIG. 12 is a view for explaining detection results of an object by the radar device according to the second embodiment.

By contrast, the distance d between the receiver antennas used in the detection operation in the third operation mode and the fourth operation mode is "d=1.41×λ/2." Therefore, the relationship between the arrival angle θ and the phase difference ω between the receiver antennas at this time is as represented by the broken line in FIG. 12.

Here, the detection precision of the arrival angle θ is proportional to the inclination of the antenna phase difference. Also, the detection precision of the arrival angle θ is higher as the change in the phase difference between the receiver antennas RXA is greater with respect to the change in arrival angle θ. Therefore, to improve the detection precision of the arrival angle θ, it is desirable to determine the 3D coordinates of the target by the second detection operation (the third operation mode and the fourth operation mode). Also, the second detection operation has a feature that use at an arrival angle of 45 [deg.] or less is desirable.

Figure 14B:
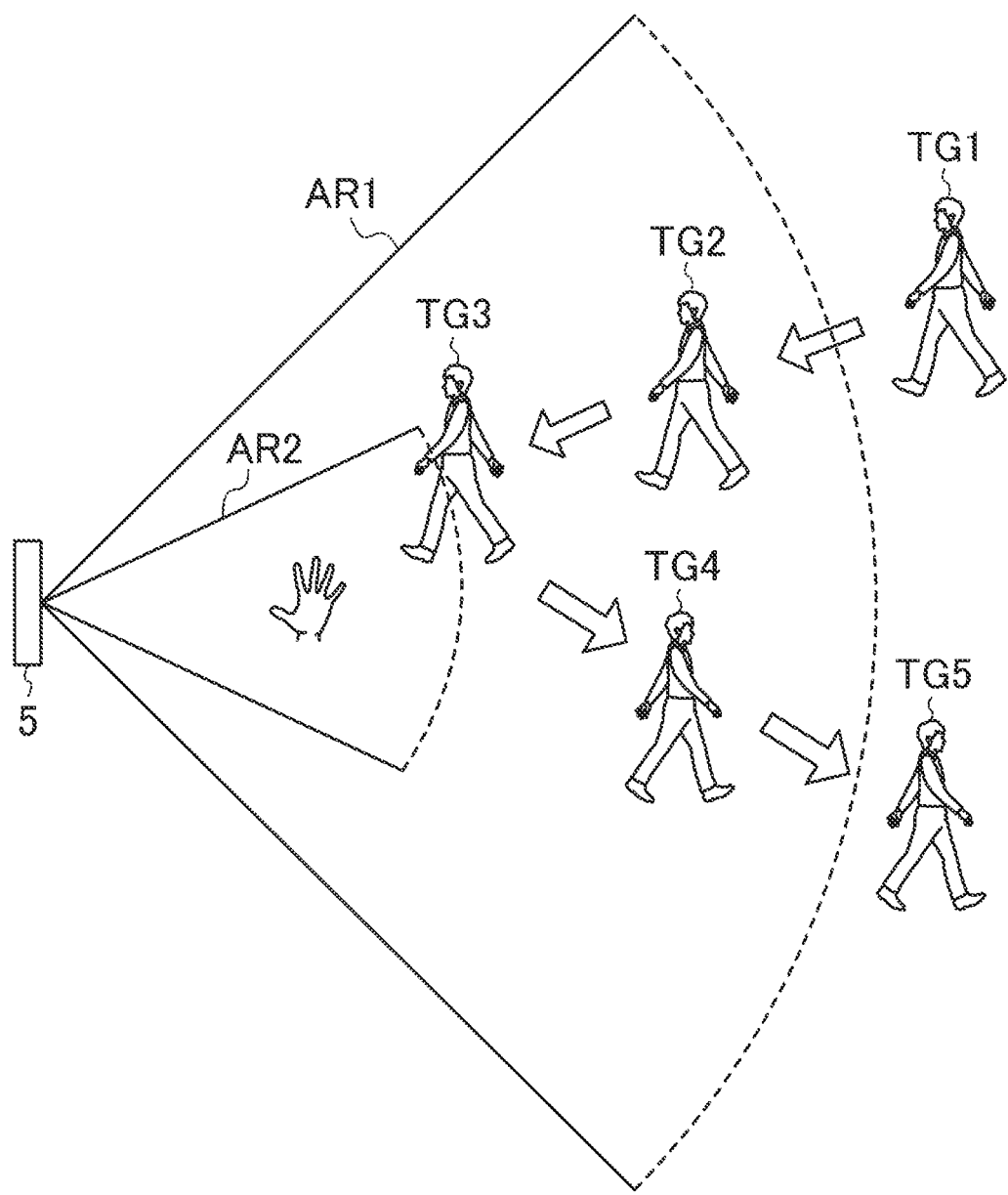
FIG. 14B is another view for explaining detection areas of the position detection system.

By contrast, in determining the 3D coordinates of the target by the first detection operation (the first operation mode and the second operation mode), although the detection precision of the arrival angle θ is low compared to the second detection operation, the phase difference between the receiver antennas is not inverted as the arrival angle θ becomes large, whereby the arrival angle θ can be calculated correctly independently of the degree of the angle. That is, the first detection operation has a feature that wider field of view (FOV) performance can be achieved. FIGS. 14A and 14B illustrate examples of an area AR1 in which detection is made by the first detection operation and an area AR2 in which detection is made by the second detection operation.

Specific Example of Position Detection Operation

Referring to FIGS. 14A, 14B, 15A, and 15B, the target position detection operation combining the first detection operation and the second detection operation will be described.

Described here will be an example in which the presence and position of a target TG is detected by the first detection operation capable of wide field of view (FOV) detection and then fine movement of the target TG, such as gestures, is detected by high-precision arrival-angle detection in a front field of view (FOV) by the second detection operation.

First, upon startup of the position detection system, the first detection operation by the first time-division operation unit is executed repeatedly with a predetermined first period TL1, to detect the presence and/or position of the target TG. For example, when the target TG moves from position TG1 to position TG2 in FIG. 14B, presence detection and localization of the target TG can be performed.

Assume then that the target TG moves from position TG2 to position TG3 in FIG. 14B, entering the area AR2 that is the field of view in the second detection operation. At this time, as indicated by the arrow of "presence detected" in FIGS. 15A and 15B, the position detection system switches the operation of the radar device 1 to the second detection operation by the second time-division operation unit, to execute the second detection operation repeatedly with a predetermined second period TL2 for detecting fine movement (such as gestures) of the target with high precision.

The second period TL2 is not specifically limited, but made to be shorter than the first period TL1 as shown in FIG. 15A, for example. To which degree the second period TL2 should be shorter than the first period TL1 is not specifically limited, but may be as short as about one-tenth of the first period TL1.

Alternatively, as shown in FIG. 15B, while the first detection operation by the first time-division operation unit is repeated with the first period TL1, the second detection operation by the second time-division operation unit may be repeated with the second period TL1 during intervals between the first detection operations. By executing the first detection operation together with the second detection operation, it is possible to perform constant detection of the presence and/or position of a target by the first detection operation and also perform smooth ON/OFF control to/from the second detection operation.

Next, assume that the target TG moves from position TG3 to position TG4 in FIG. 14B, going out of the area AR2. At this time, as indicated by the arrow of "absence detected" in FIGS. 15A and 15B, the position detection system stops the second detection operation by the second time-division operation unit and sets to repeat the first detection operation by the first time-division operation unit with the first period TL1.

By the operation as described above, while the presence and/or position of a target TG can be detected over a wide field of view, fine movement detection can be performed for a target TG approaching a predetermined area from the radar device 1.

The method of object (target) detection such as presence detection and position detection is not specifically limited. As an example, however, the presence detection may be performed based on whether the signal level of the beat signals has exceeded a threshold value, and the position detection may be performed based on whether the frequency of the beat signals is within a predetermined range. The threshold value used at this time may be a predetermined fixed value, may be a value determined by constant false alarm rate (CFAR) processing after the FFT processing of the signal level received from a receiver antenna, may be obtained by averaging, or may be determined based on the signal level during absence of an object.

The first period TL1 and the second period TL2 may be changed depending on the presence/absence of a target and the position of a target. For example, when the target TG is outside the area AR1 that is the field of view in the first detection operation (e.g., positions TG1 and TG5 in FIG. 14B), the first period TL1, which is the repetition period for the first detection operation, may be made longer than when the target is inside the area AR1. In general, detection with a short period is unnecessary for presence detection and position detection. Therefore, the power consumption of the detection system can be reduced by setting a longer period.

—Alteration—

Figure 13:
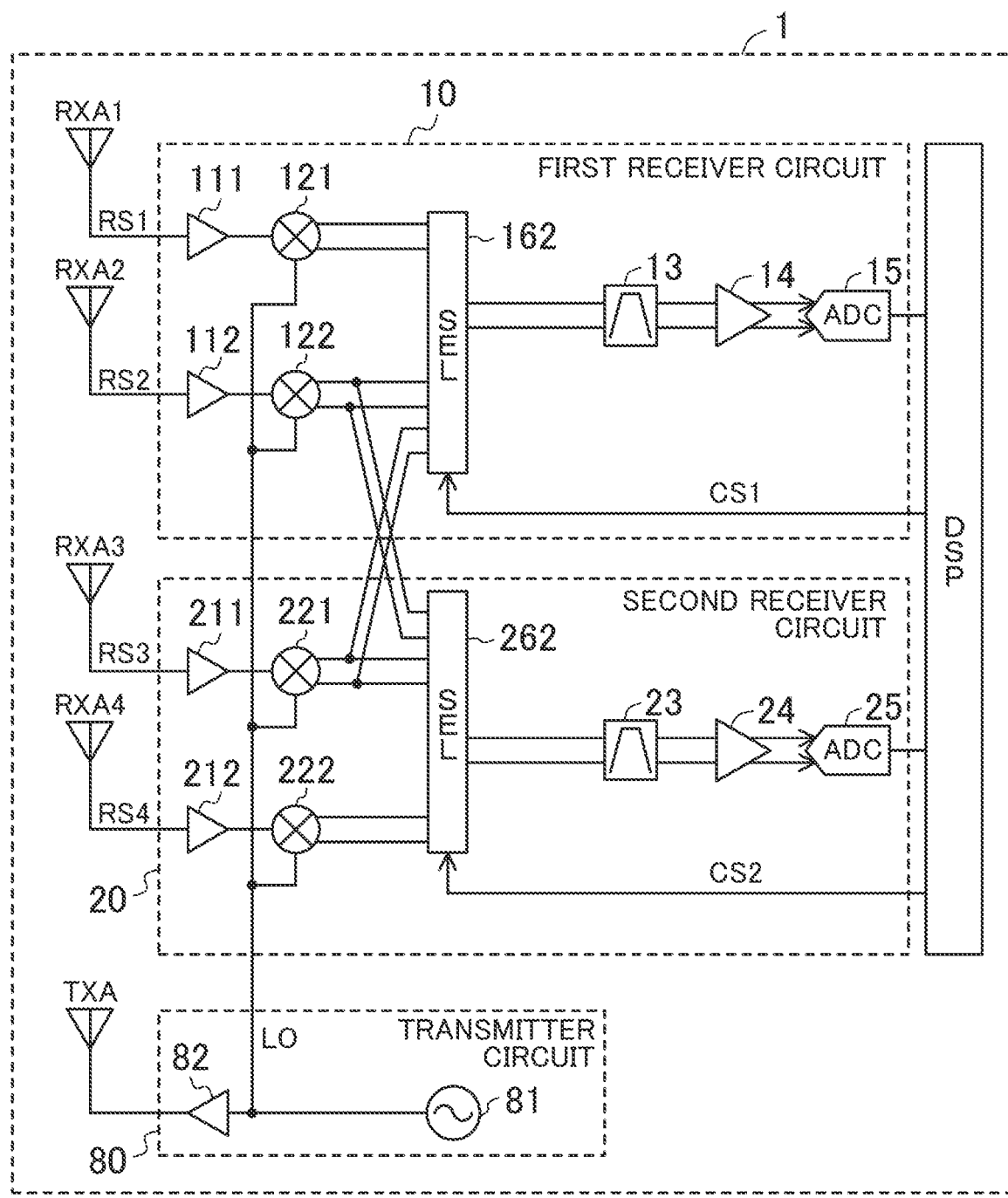
FIG. 13 is a block diagram showing a configuration of a radar device of an alteration according to the second embodiment.

FIG. 13 is a block diagram showing a configuration example of a radar device 1 according to an alteration of the second embodiment. In FIG. 13, components in common with FIG. 9 are denoted by common numerical characters, and description will be made centering on differences from the above embodiment.

In FIG. 13, in the first receiver circuit 10, a switch circuit 162 is placed downstream of mixers 121 and 122. Also, in the second receiver circuit 20, a switch circuit 262 is placed downstream of mixers 221 and 222.

Specifically, in this alteration, the mixer 121 receives the first reception signal RS1 from the first receiver antenna RXA1, mixes the first reception signal RS1 with the local oscillating signal LO to generate beat signals, and outputs the signals to the switch circuit 162. The mixer 122 receives the second reception signal RS2 from the second receiver antenna RXA2, mixes the second reception signal RS2 with the local oscillating signal LO to generate beat signals, and outputs the signals to the switch circuit 162. The switch circuit 162 selects the output signals of the mixer 121, the output signals of the mixer 122, or the output signals of the mixer 221 based on the antenna control signal CS1 from the DSP 40, and outputs the selected ones to the filter circuit 13.

Similarly, the mixer 221 receives the third reception signal RS3 from the third receiver antenna RXA3, mixes the third reception signal RS3 with the local oscillating signal LO to generate beat signals, and outputs the signals to the switch circuit 262. The mixer 222 receives the fourth reception signal RS4 from the fourth receiver antenna RXA4, mixes the fourth reception signal RS4 with the local oscillating signal LO to generate beat signals, and outputs the signals to the switch circuit 262. The switch circuit 262 selects the output signals of the mixer 122, the output signals of the mixer 221, or the output signals of the mixer 222 based on the antenna control signal CS2 from the DSP 40, and outputs the selected ones to the filter circuit 23.

In this alteration, also, the radar device 1 can determine the 3D coordinates of the target by executing operation and processing similar to those in the above embodiment. Also, in this alteration, since the switch circuit 162 performs switching among the beat signals output from the mixers 121, 122, and 221, and the switch circuit 262 performs switching among the beat signals output from the mixers 122, 221, and 222, a slow switching speed is acceptable for the switch circuits 162 and 262. Therefore, the power consumption of the radar device 1 can be reduced.

—Other Alteration—

While the first to fourth receiver antennas RXA1 to RXA4 are placed so that their centers of gravity are at the vertexes of a square having a length of one side of d1 or a rectangle having lengths of two sides of d11 and d12, the placement is not limited to these. For example, the position of the first receiver antenna RXA1 and/or the second receiver antenna RXA2 may be displaced from the position of the third receiver antenna RXA3 and/or the fourth receiver antenna RXA4 in the Y direction. For example, the first to fourth receiver antennas RXA1 to RXA4 may be placed so that their centers of gravity are at the vertexes of a parallelogram. In this case, also, similar effects to those obtained in the above embodiment can be obtained.

Third Embodiment

Figure 16:
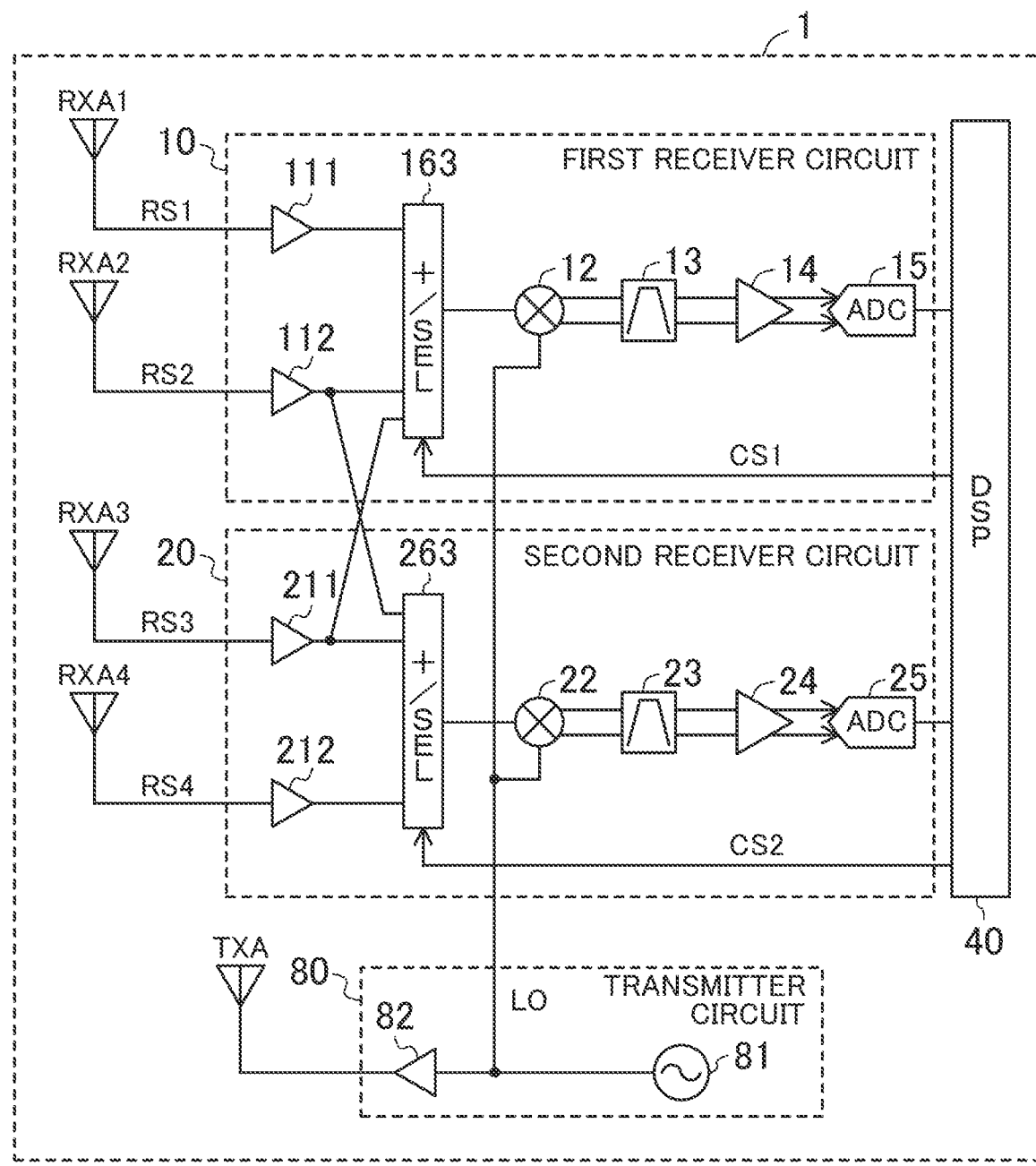
FIG. 16 is a block diagram showing a configuration of a radar device according to the third embodiment.

FIG. 16 is a block diagram showing a configuration example of a radar device 1 according to the third embodiment. In FIG. 16, components in common with FIG. 9 are denoted by common numerical characters, and description will be made centering on differences from the second embodiment.

In this embodiment, a switch circuit 163 having an addition function is provided in place of the switch circuit 161 in the second embodiment, and a switch circuit 263 having an addition function is provided in place of the switch circuit 261. Specifically, the switch circuit 163 has a function of adding the signals from the first and second receiver antennas RXA1 and RXA2 and a function of adding the signals from the first and third receiver antennas RXA1 and RXA3, in addition to the signal selection function of the switch circuit 161. The switch circuit 263 has a function of adding the signals from the third and fourth receiver antennas RXA3 and RXA4 and a function of adding the signals from the second and fourth receiver antennas RXA2 and RXA4, in addition to the signal selection function of the switch circuit 261.

The detection system of this embodiment has fifth and sixth operation modes, in addition to the first to fourth operation modes described in the second embodiment. The processing in the fifth and sixth operation modes is similar to that in the first to fourth operation modes described above. Herein, therefore, description will be made centering on differences from the first to fourth operation modes.

[Fifth Operation Mode]

In the fifth operation mode, the switch circuit 163 adds up the signals from the first and second receiver antennas RXA1 and RXA2, and the switch circuit 263 adds up the signals from the third and fourth receiver antennas RXA3 and RXA4.

[Sixth Operation Mode]

In the sixth operation mode, the switch circuit 163 adds up the signals from the first and third receiver antennas RXA1 and RXA3, and the switch circuit 263 adds up the signals from the second and fourth receiver antennas RXA2 and RXA4.

In the fifth and sixth operation modes, since the distance R1 from an object and one arrival angle θ can be detected, the two-dimensional (2D) coordinates of the target can be specified. In the fifth and sixth operation modes, the signal obtained by adding up reception signals from two receiver antennas is processed in each of the first and second receiver circuits 10 and 20. Therefore, this embodiment has a feature that the signal quality is improved and the object detection distance can be increased.

Specific Example of Position Detection Operation

Figure 17:
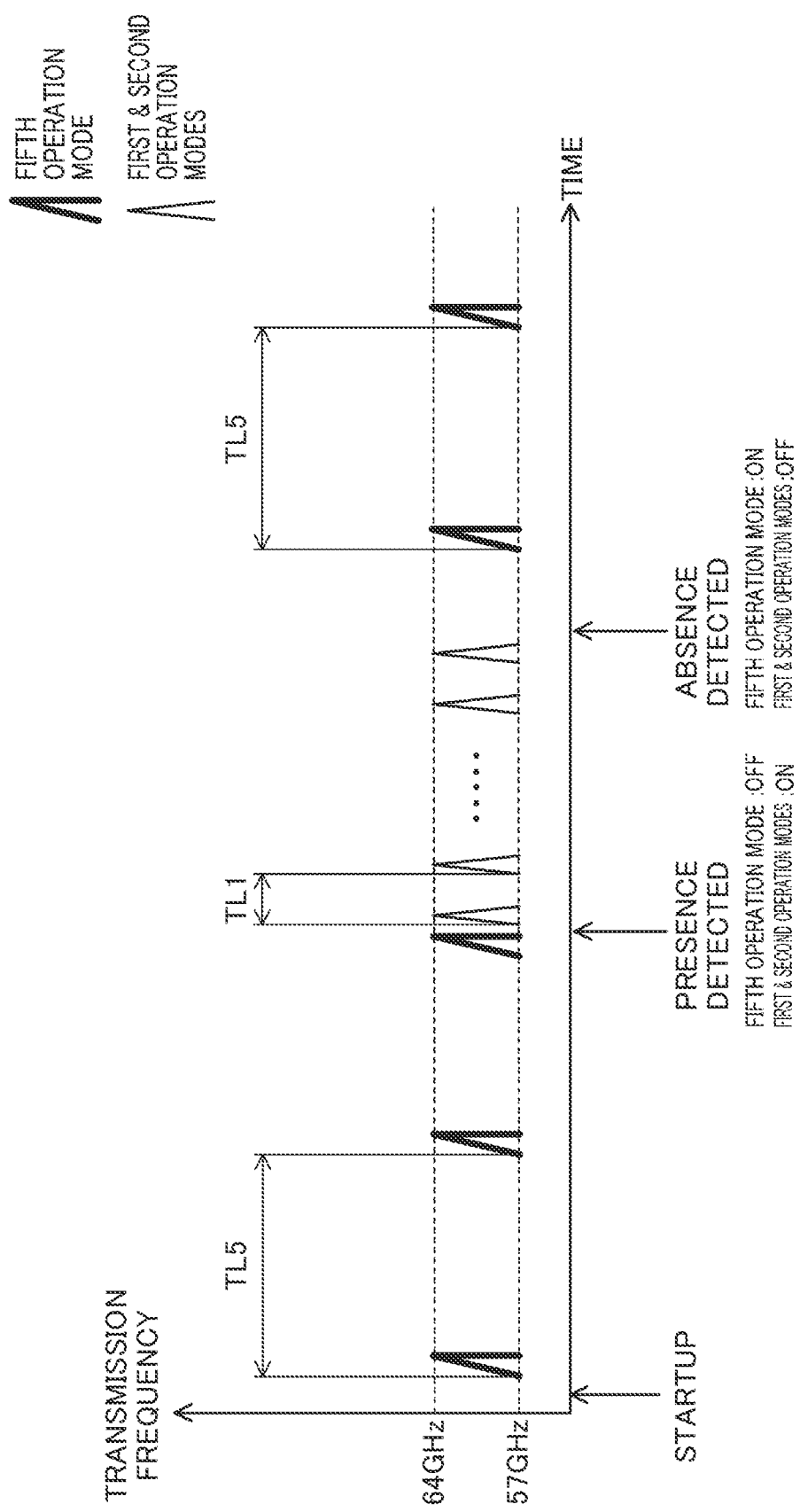
FIG. 17 is a view showing an operation example of a position detection system of the third embodiment.

Referring to FIGS. 14B and 17, the target position detection operation combining the first detection operation, the second detection operation, and the fifth operation mode will be described.

As shown in FIG. 17, upon startup of the position detection system, the processing in the fifth operation mode is executed repeatedly with a predetermined fifth period TLS, to detect the presence and/or position of the target TG.

Assume then that the target TG moves from position TG1 to position TG2 in FIG. 14B, entering the area AR1 that is the field of view in the first detection operation. At this time, as indicated by the arrow of "presence detected" in FIG. 17, the position detection system stops the processing in the fifth operation mode and switches the operation of the radar device 1 to the first detection operation by the first time-division operation unit, to execute the first detection operation repeatedly with the first period TL1.

Although not illustrated in FIG. 17, when the target TG moves from position TG2 to position TG3, similar operation to that described in the second embodiment is performed.

Assume then that the target TG moves from position TG4 to position TG5 in FIG. 14B, going out of the area AR1. At this time, as indicated by the arrow of "absence detected" in FIG. 17, the position detection system stops the first detection operation by the first time-division operation unit and sets to repeat the processing in the fifth operation mode with the fifth period TLS.

Note that, in this embodiment, while the target position detection operation is performed combining the first detection operation, the second detection operation, and the fifth operation mode, the operation is not limited to this. For example, the target position detection operation may be performed combining the sixth operation mode, in place of the fifth operation mode, or may be performed combining the sixth operation mode in addition to the fifth operation mode.

According to the present disclosure, size reduction, cost reduction, and low power consumption are achieved while both simplification of signal processing and enhanced precision of angle detection are fulfilled. The radar device according to the present disclosure is therefore useful as a radar device detecting the position of a target.

What is claimed is:

1. A position detection system, comprising:
a first receiver antenna outputting a first reception signal;
a second receiver antenna outputting a second reception signal, placed apart from the first receiver antenna by a first distance in a first direction;
a third receiver antenna outputting a third reception signal, placed apart from the first receiver antenna by a second distance in a second direction perpendicular to the first direction;
a fourth receiver antenna outputting a fourth reception signal, placed apart from the second receiver antenna by the second distance in the second direction and apart from the third receiver antenna by the first distance in the first direction; and
a signal processor,
wherein
the signal processor has
a first operation mode of receiving and processing the first reception signal and the second reception signal,
a second operation mode of receiving and processing the first reception signal and the third reception signal,
a third operation mode of receiving and processing the first reception signal and the fourth reception signal, and
a fourth operation mode of receiving and processing the second reception signal and the third reception signal, 3D coordinates of a target are calculated from processed results of the first operation mode and the second operation mode, 3D coordinates of the target are calculated from processed results of the third operation mode and the fourth operation mode, and the signal processor performs first detection operation of repeating a first time-division operation unit of performing time-division processing of the first operation mode and the second operation mode with a first period, and second detection operation of repeating a second time-division operation unit of performing time-division processing of the third operation mode and the fourth operation mode with a second period shorter than the first period.

2. The position detection system of claim 1, wherein the signal processor performs the second detection operation in place of the first detection operation when the target enters a predetermined area during the first detection operation.

3. The position detection system of claim 2, wherein the signal processor performs the first detection operation in place of the second detection operation when the target goes out of the predetermined area during the second detection operation.

4. The position detection system of claim 1, wherein the signal processor performs the second detection operation in addition to the first detection operation when the target enters a predetermined area during the first detection operation.

5. The position detection system of claim 4, wherein the signal processor stops the second detection operation when the target goes out of the predetermined area during the second detection operation.

6. The position detection system of claim 1, wherein the signal processor further has third detection operation in a fifth operation mode, the fifth operation mode being a mode receiving and processing a signal obtained by adding up the first reception signal and the second reception signal and a signal obtained by adding up the third reception signal and the fourth reception signal, and the third detection operation is repeated with a third period.

7. The position detection system of claim 6, wherein the signal processor performs the first detection operation when the target enters a predetermined area during the third detection operation.

8. A position detection system, comprising:

a first receiver antenna outputting a first reception signal;

a second receiver antenna outputting a second reception signal, placed apart from the first receiver antenna by a first distance in a first direction;

a third receiver antenna outputting a third reception signal, placed apart from the first receiver antenna by a second distance in a second direction perpendicular to the first direction;

a fourth receiver antenna outputting a fourth reception signal, placed apart from the second receiver antenna by the second distance in the second direction and apart from the third receiver antenna by the first distance in the first direction; and a signal processor, wherein the signal processor has a first operation mode of receiving and processing the first reception signal and the second reception signal, a second operation mode of receiving and processing the first reception signal and the third reception signal, a third operation mode of receiving and processing the first reception signal and the fourth reception signal, and a fourth operation mode of receiving and processing the second reception signal and the third reception signal, 3D coordinates of a target are calculated from processed results of the first operation mode and the second operation mode, 3D coordinates of the target are calculated from processed results of the third operation mode and the fourth operation mode, the signal processor further has a fifth operation mode of receiving and processing a signal obtained by adding up the first reception signal and the second reception signal and a signal obtained by adding up the third reception signal and the fourth reception signal, and 2D coordinates of the target are calculated from processed results of the fifth operation mode.

* * * * *